United States Patent [19]
Bales et al.

[11] Patent Number: 5,182,750
[45] Date of Patent: Jan. 26, 1993

[54] TRANSPARENT REMOTING OF SWITCHING NETWORK CONTROL OVER A STANDARD INTERFACE LINK

[75] Inventors: Bruce M. Bales, Louisville; Robert L. Crumpley, Westminster; Sandra S. North, Golden; Stephen M. Thieler, Boulder, all of Colo.

[73] Assignee: AT&T Bell Laboratories, Murray Hill, N.J.

[21] Appl. No.: 636,523

[22] Filed: Dec. 31, 1990

[51] Int. Cl.$^5$ .............................................. H04J 3/12
[52] U.S. Cl. ........................... 370/110.1; 370/58.2; 370/16; 379/221; 379/230; 379/269
[58] Field of Search .................. 370/110.1, 56, 58.2, 370/68.1, 16; 340/827; 379/269, 220, 221, 230, 207, 333, 334

[56] References Cited

U.S. PATENT DOCUMENTS

| | | | |
|---|---|---|---|
| 4,160,129 | 7/1979 | Peyser et al. | 379/220 |
| 4,504,942 | 3/1985 | Ato et al. | 379/269 |
| 4,583,218 | 4/1986 | Ardon et al. | 370/56 |
| 4,621,358 | 11/1986 | Jotwani | 370/56 |
| 4,656,623 | 4/1987 | Dalby, Jr. et al. | 370/60 |
| 4,764,919 | 8/1988 | Hunter et al. | 370/60 |
| 4,988,209 | 1/1991 | Davidson et al. | 370/58.1 |
| 5,023,868 | 6/1991 | Davison et al. | 370/62 |
| 5,036,535 | 7/1991 | Gechter et al. | 379/210 |
| 5,062,103 | 10/1991 | Davidson et al. | 370/58.1 |

OTHER PUBLICATIONS

J. C. Borum, "The 5ESS Switching System: Hardware Design", *AT&T Technical Journal*, vol. 64, No. 6 Part 2 (Jul.-Aug. 1985) pp. 1417-1437.

*Primary Examiner*—Benedict V. Safourek
*Assistant Examiner*—H. Kizou
*Attorney, Agent, or Firm*—John C. Moran

[57] ABSTRACT

A switching architecture interconnecting remote switches to a central processor via standard links which may be set up through any number of intervening switching systems utilizing standard switching procedures. The standard links are ISDN links that may be set up dynamically via switching networks within the switching system or via the public switching network. The fact that an ISDN goes through a portion of the switching system or the public switching network is transparent to both the central processor and remote switch. Upon detecting that a primary central processor is no longer in control, each remote switch attempts to obtain an alternate path to the primary central processor. If a remote switch is unable to obtain an alternate path to the primary central processor, the remote switch switches to an alternate central processor on the assumption that the primary central processor has failed. Because the paths can be made on directly connected ISDN links, through the switching system, or through the public switching network to either the primary central processor or the alternate central processor, there is a high probability of a remote switch being able to obtain such a path.

28 Claims, 12 Drawing Sheets

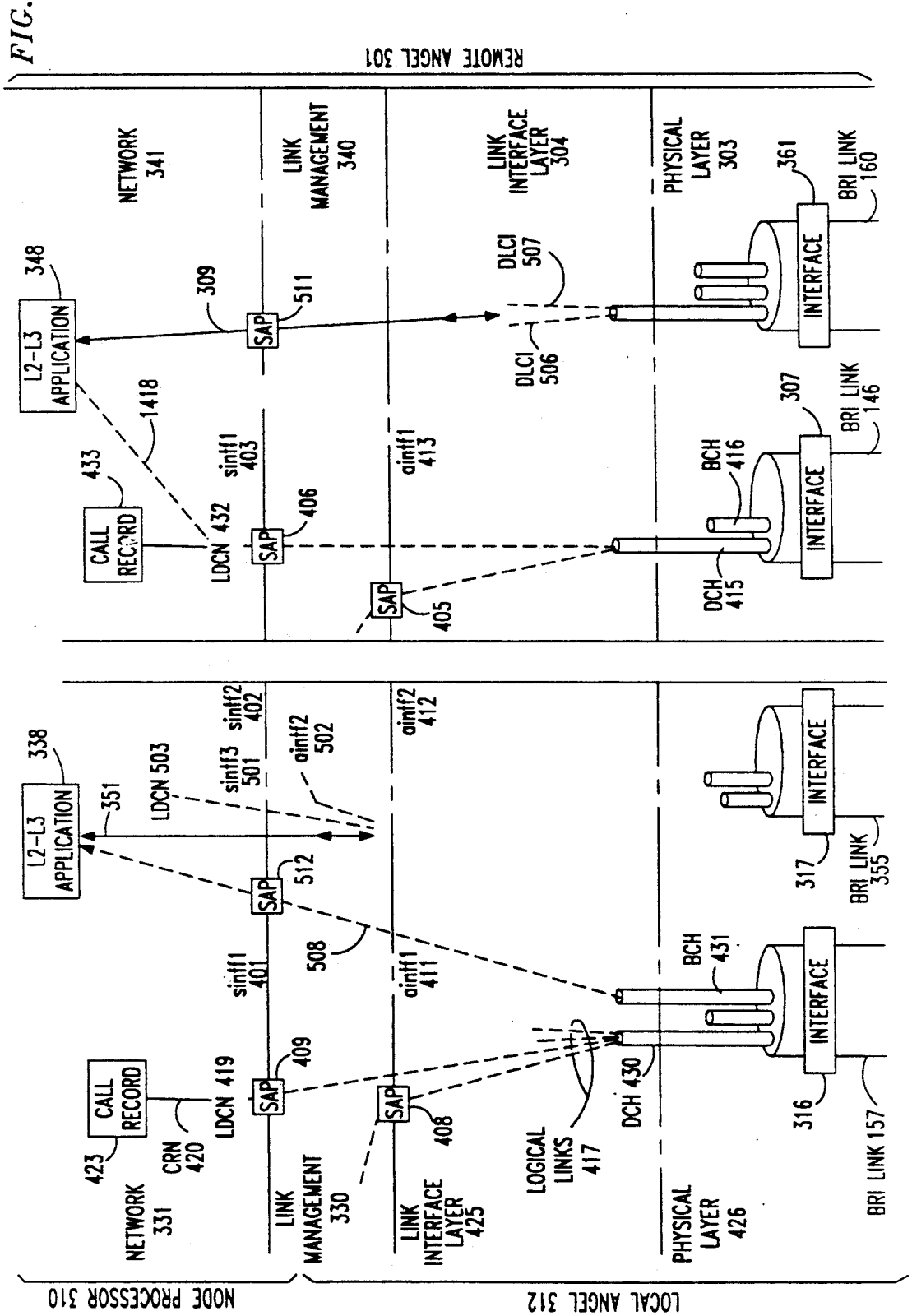

TRANSPARENT REMOTING OF SWITCHING NETWORK CONTROL OVER A STANDARD INTERFACE LINK

TECHNICAL FIELD

This invention relates to a communication switching system having a plurality of remote switching networks controlled by a central processor.

BACKGROUND OF THE INVENTION

In the prior art, it is known to remote a switch under control of a remote processor (also referred to as a co-located or angel processor) from a central processor which provides high-level control to the remote switch. The prior art requires that a dedicated link be utilized to interconnect the remote switch with the central processor. One such prior art system is the AT&T 5 ESS as described in the *AT&T Technical Journal*, Vol. 64, #6, Part 2, July-August 1985. The remote switching module of the 5 ESS is a switching network controlled by a remote processor which is remoted from the center stage switch and the central processor via dedicated T−1 trunk facilities which cannot be switched by an intervening switching network. In addition, co-located with the central processor are other switching modules which are interconnected to the center stage switch and the central processor via special purpose dedicated data links.

The principal problem with this type of switching architecture is one of reliability since the failure of either a link or the central processor disables not only the remote switching network but also any local switching networks co-located with the central processor. In particular, since the central processor controls every switching network in the switching system, failure of the central processor means failure of the entire switching system. To prevent the failure of an individual switching network or the entire switching system, the 5 ESS and other prior art switching systems have duplicated the links and the central processor. Such duplication has proven to be expensive and not entirely satisfactory.

Another problem with the use of dedicated links is that it limits the flexibility in the topology of switching networks with respect to using a plurality of central processors to control a plurality of remote processors and the geographical location of the remote processors. Particularly, such use prohibits dynamically assigning remote processors to different central processors.

SUMMARY OF THE INVENTION

The foregoing problems are solved and a technical advance is achieved by a new switching architecture and method that connect remote switches to a central processor (node processor) via standard links which may be set up through any number of intervening switching systems utilizing standard switching procedures. In a preferred embodiment, the standard links are ISDN links that are be set up dynamically via switching networks within the switching system or via the public switching network. Advantageously, the fact that an ISDN link goes through a portion of the switching system or the public switching network is transparent to both the central processor and remote switch.

Upon detecting that a primary central processor is no longer in control, each remote switch attempts to obtain an alternate path to the primary central processor. If a remote switch is unable to obtain an alternate path to the primary central processor, the remote switch switches to an alternate central processor on the assumption that the primary central processor has failed. Because the paths can be made on directly connected ISDN links, through the switching system, or through the public switching network to either the primary central processor or the alternate central processor, there is a high probability of a remote switch being able to obtain such a path to a central processor.

A remote switch may be connected to the central processor through a portion of the switching system via ISDN links. To place calls switched by the remote switch under control of the central processor, the remote switch and the central processor each execute a plurality of hierarchical call control functions. Utilizing the ISDN protocol, these call control functions initiate and maintain a call through the switching system via the ISDN links. After initiating the call, the remote switch and the central processor establish a transport path on the call. Upon establishment of the transport path, low level call control functions in the remote switch transmit (via the transport path) all signaling and control information for other calls (that are switched by the remote switch) to high level call control functions in the central processor. However, the call that is communicating the transport path remains entirely under the control of the call control functions in the remote switch. The high level control functions in the central processor process the information and generate new signaling and control information. In order to control the other calls, this new information is transmitted to the low level call control functions in the remote switch via the transport path.

A remote processor (also referred to as an angel processor) controls the remote switch. The remote processor and central processor each perform the plurality of hierarchical call control functions by executing software layers. The lowest software layers perform the low level control functions, and the intermediate through highest software layers perform the high level call control functions. Both processors have an application software module in the highest software layer, and the transport path is established between the two application software modules.

The lowest software layers in the remote processor first transfer the signaling and control information to the application software module in the remote processor. In turn, that application software module encapsulates the information and transmits it to the application software module in the central processor. In response, the application software module in the central processor recovers the information and transfers it to the intermediate software layer of the central processor for high level call processing. The resulting new signaling and control information is transferred to the application software module of the central processor by the intermediate software layer of the central processor. That application software module encapsulates the information and transmits it to the application software module of the remote processor via the transport path. In response, the application software module of the remote processor recovers the new information and transfers it to the lowest software layers of the remote processor for low level control of the other calls.

Each ISDN links has plurality of B channels and a D channel having a number of logical links. Advantageously, the transport path may be established on packetized B channels of the ISDN links communicating the call, on logical links of D channels of the ISDN links communicating the call, or by utilizing user communication facilities associated with the call.

In addition, a remote switch may be directly connected to the central processor by an ISDN link or may be connected via the public switching network. In both cases, the central processor performs high level control call on calls in the remote switch in a manner similar to that previous described.

Other and further aspects of the present invention will become apparent during the course of the following description and by reference to the accompanying drawing.

BRIEF DESCRIPTION OF THE DRAWING

FIGS. 13 and 14 illustrate other embodiments of the invention.

DETAILED DESCRIPTION

System Overview

Figure 1:
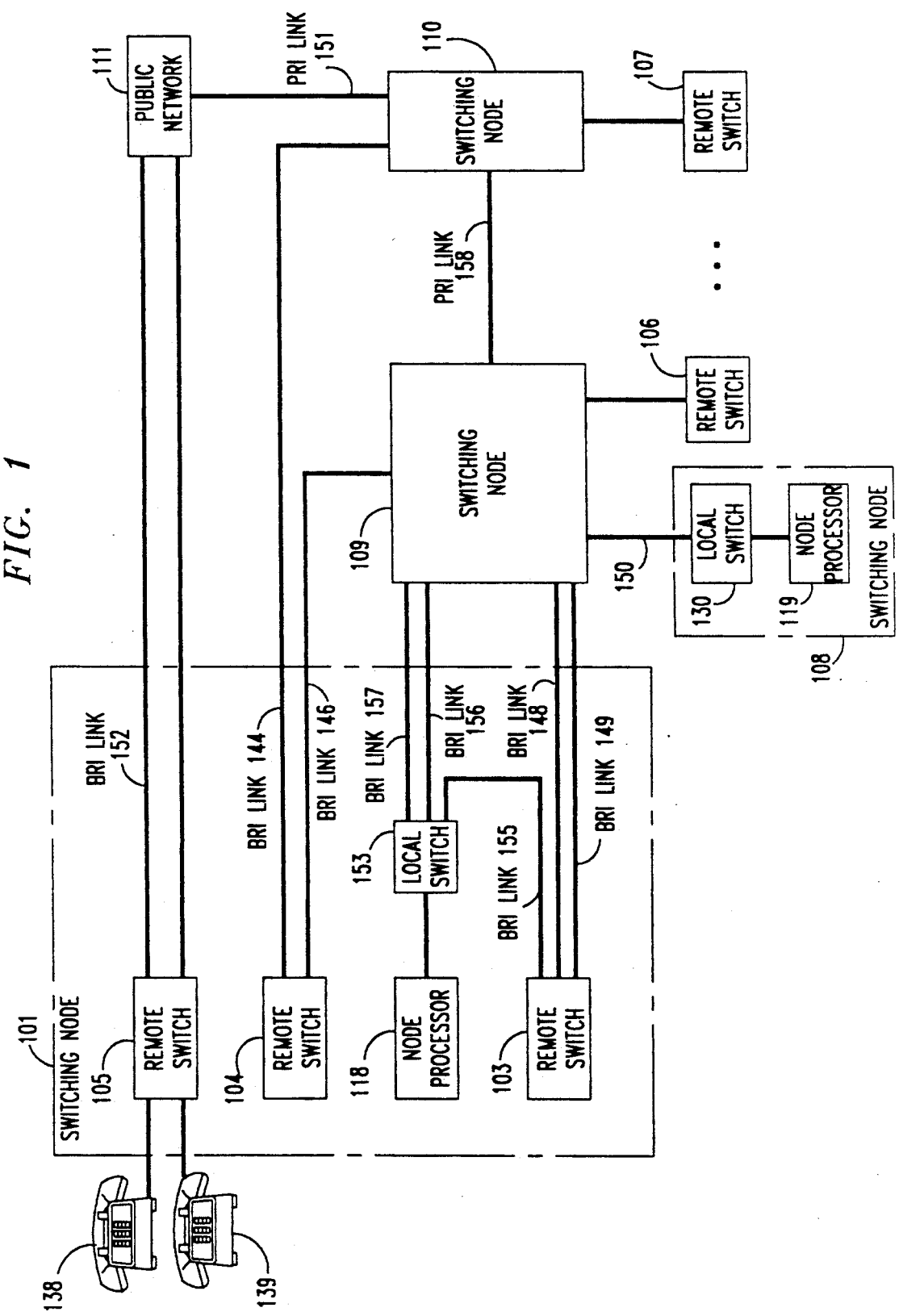
FIG. 1 illustrates, in block diagram form, a telecommunications switching system embodying the inventive concept.

FIG. 1 shows a communication system having a plurality of switching nodes, local switches, and remote switches. Switching nodes 101, 109, and 110 are similar in construction in that each has a local switch and may have one or more remote switches. However, switching node 108 is utilized so as to provide a spare node processor within the switching system illustrated in FIG. 1 and initially does not have any associated remote switches. Switching node 101 illustrates the structure of a switching node. Switching node 101 is controlled by node processor 118 which directly controls local switch 153. In addition, switching node 101 comprises remote switches 103, 104, and 105. In accordance with the invention, each remote switch has a network with associated interfaces terminating ISDN links and an angel processor that provides only low order control of the network and interfaces with the exception of the interface utilized to interconnect the remote switch to the node processor. Further in accordance with the invention, node processor 118 provides the high level control functions for its remote switches. Switching nodes 109 and 110 are similar to switching node 101.

Within switching node 101 in accordance with the invention, the remote switches communicate signaling and control information with node processor 118 via standard ISDN links, i.e., BRI links 155, 156, and 157. Each of these links has an associated D channel and is fully controlled by the remote switch. As an example, remote switch 103 communicates signaling and control information via BRI link 155; remote switch 104 communicates signaling and control information via BRI link 146, switching node 109, and BRI link 157; and remote switch 105 communicates signaling and control information via BRI link 152, public network 111, PRI link 151, switching node 110; PRI link 158, switching node 109, and BRI link 156. Node processor 118 directly communicates with local switch 153. On each of the communication paths interconnecting node processor 118 to remote switches 103, 104, 105, a packetized channel is established in accordance with the invention. The intervening switching nodes and public network 111 perform no control operations on these packetized channels. Further, software running on node processor 118 is unaware of whether a switch is local or remote.

Figure 2:
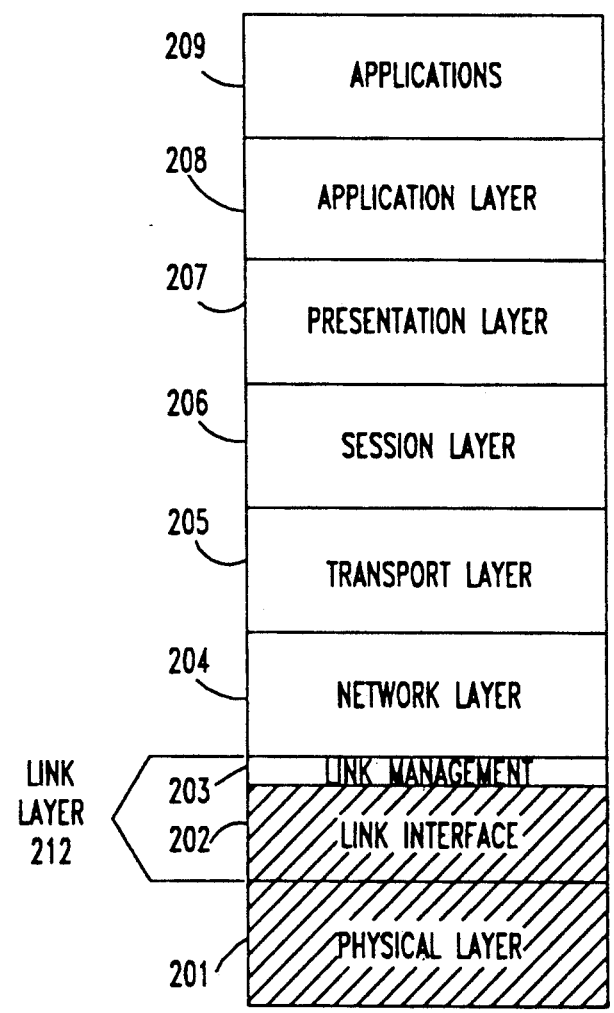
FIG. 2 illustrates a software architecture in accordance with the invention.

As discussed in greater detail with respect to FIG. 2, the node processors and the angels in the remote switches implement a software architecture based on the standard OSI model but which is modified in accordance with the invention. To understand the signaling and control information which is exchanged between the remote angels and the node processor, a brief explanation of this OSI model is now given. The OSI model has a physical layer which is responsible for maintaining physical channels and controlling physical interfaces, a link layer which allows the establishment of packet protocols on physical channels, a network layer which is responsible for negotiating the utilization of system resources for the termination or origination of calls plus higher layers that perform other various aspects of the OSI model.

After establishment of the packetized channel between a remote switch and node processor 118, the remote switch provides the physical and the link layer; whereas, node processor 118 provides the network layer plus the higher layers for switching calls. The information that is communicated between the network and link layers is the information which is communicated over the packetized channel. In accordance with the invention, this packetized channel is implemented in such a manner that the remote switch appears to be handled in the same manner as local switch 153 from the perspective of node processor 118.

Consider now in more detail the initialization and error recovery performed by switching node 101. As each remote switch is initialized, it determines that its primary node processor is node processor 118 and places a normal telephone call to node processor 118. When node processor 118 responds, the remote switch and node processor 118 establish the packetized channel in accordance with the invention. For example, remote switch 104 places a call to node processor 118 via switching node 109. Since a standard call is being placed, switching node 109 responds in a normal manner and provides a circuit switched path for the call. Remote switch 104 and node processor 118 then perform the functions of initializing a packetized channel.

Consider an example illustrating fault recovery with respect to remote switch 103. In this example, BRI link 155 fails, severing the packetized channel between remote switch 103 and node processor 118. Upon being informed of the fact that BRI link 155 has failed, remote switch 103 places a call to node processor 118 utilizing an alternate call path as determined by standard call processing functions. One such path is via BRI link 148 or 149 through switching node 109 to BRI links 156 or 157 to local switch 153 and then from local switch 153 to node processor 118. To establish such paths, remote switch 103 places a standard call to node processor 118. After the call is answered by node processor 118, the latter processor and remote switch 103 establish the packetized channel for use in transferring information between remote switch 103 and node processor 118.

Consider the second example that illustrates how further reliability is achieved. Switch node 108 comprises node processor 119 and local switch 130. Node processor 119 is a spare node processor which can assume control of any of the remote switches that are presently under control of switching node 101, 109 and 110. Advantageously, the latter switching nodes can also assume control of remote switches associated with other nodes; however, this could place a heavy processing load on each node processor within these switching nodes. For this reason, node processor 119 is provided as a spare.

For example, upon failure of node processor 118, remote switches 103, 104, and 105 recognize this fact and initially attempt to establish an alternate path to node processor 118 assuming that it is a link failure. Upon being unable to establish a path to node processor 118, these remote switches interrogate an internal table and determine that a secondary node processor is node processor 119, and each remote switch proceeds to set up a packetized channel with node processor 119 using the methods previously discussed. For example, remote switch 103 is also directly connected to node processor 119 by an BRI link (not illustrated in FIG. 1). Remote switch 103 initially attempts to utilize this direct BRI link to establish a path to node processor 119. If the direct BRI link fails, remote switch 103 establishes a path to node processor 119 via BRI links 148 or 149, switching node 109, BRI link 150, and local switch 130.

Software Architecture

FIG. 2 illustrates the software architecture of the switching nodes of FIG. 1. This architecture is based on the conventional OSI model modified to implement the ISDN protocol. In accordance with the invention as described herein, certain further modifications have been made to the standard model in order to accomplish the expansion of ISDN capabilities to include the remote switch capabilities of the invention.

Looking ahead, it will be seen that the software structure of FIG. 2 is implemented in each node processor and remote switch. However, in a remote switch, the whole structure is only functional with respect to the ISDN link (i.e. BRI link 155) that is used to communicate signaling and control information between the remote switch and the controlling node processor. For the remaining links, the lower software layers collect the signaling and control information and communicate it to the highest layer. In response to this information, the highest layer encapsulates it and communicates the encapsulated information to the highest layer in the node processor via a packetized channel. The highest layer in the node processor recovers the information and reinserts it into an intermediate layer that receives all signaling and control information for the switching node. By reinserting the information, the various functions for controlling the remote switch can be carried out by higher software layers in a transparent manner that is the same as if the hardware of the remote switch was directly controlled by the node processor. Similarly, signaling and control information from those software layers is transferred from the intermediate software layer to the highest software layer which encapsulates it and transmits encapsulated information via the packetized channel to the highest software layer in the remote switch. This highest software layer recovers the information and transfers it to the lowest software layers of the remote switch which perform the necessary functions.

In order to lay the groundwork for these operations, it is useful to describe the various software layers of the software architecture.

The principal function of physical layer 201 is to terminate physical links. Specifically, physical layer 201 is responsible for maintaining physical channels and for controlling physical subchannels thereon. Physical layer 201 comprises a software portion and physical interfaces. Further, the software portion of physical layer 201 is responsible for the direct control of the physical interfaces to which physical links communicating PRI and BRI information terminate. Physical layer 201 presents to link layer 212 physical subchannels and physical channels as entities controllable by link layer 212.

The primary function of link layer 212 is to assure that the information transmitted over a physical channel is recovered intact and in the correct order. This is accomplished using another layer of protocol which allows multiple communication paths—commonly referred to as logical links—to be established on a given physical channel or a physical subchannel communicating packetized data. These logical links are used to identify and process data being communicated between link layer 212 and physical layer 201. (An example of this type of protocol is the LAPD packet protocol used in ISDN Q.921. In the ISDN standard, link layer 212 terminates the LAPD protocol.) Link layer 212 can support multiple protocols so that the upper layers are uneffected by the different protocols being utilized. Further, link layer 212 allows higher software layers to control physical layer 201 in an abstract manner.

As seen in FIG. 2, link layer 212 is divided into link interface 202 and link management 203. The reason for this division is set forth herein below. It will be helpful at this point to discuss the communication of ISDN signals over a D channel to help readers, for example, who have only a rudimentary knowledge of the communication of ISDN signals over a D channel. At link layer 212, a plurality of logical links is established on a D channel. Only one of these logical links communicates ISDN control signals, and this logical link is referred to herein as a logical D channel (LDC). The LDC is identified by a logical D channel number (LDCN). The other logical links within a D channel have other uses which are explained in connection with FIG. 4.

Link interface 202 does the majority of the functions performed by link layer 212, including the establishment of the logical links. Link management 203 identifies the various link interfaces for higher software layers. Further, link management communicates information between the logical links and higher software layers.

Network layer 204 processes information communicated on the LDCs, and thereby terminates the ISDN Q.931 protocol. Hence, this layer is responsible for negotiating the utilization of system resources for the termination or origination of calls external to a switching node. The network layer controls the allocation of channels on an interface on which a call is being received or set up. For example, if switching node 109 receives a call from switching node 110 via PRI link 158, network layer 204 of switching node 109 negotiates with its peer layer (the corresponding network layer 204 in switching node 110) in order to obtain allocation of a B channel in PRI link 158—a procedure later to be repeated if a second B channel is desired. This negotiation is carried out using standard ISDN Q.931 messages such as the call setup and connection messages via the LDC set up on the D channel of PRI link 158. Network layer 204 identifies all B channels of given interface with the LDC for that interface. Network layer 204 is only concerned with the establishment of a call from one point to another point (e.g., node to node). The network layer is not concerned with how a call is routed internally to a particular switching node but rather transfers information up to higher layers for the determination of how a call is routed in the switching node. However, the network layer does request that one application, referred to here and below as the connection manager application, add or remove facilities on a physical interface to a switched connection within a switching node.

Specifically, the network layer carries out call setup by first determining that the request for the establishment of a call is valid and that the resources between the two switching systems are available to handle this call. After this determination, information concerning the call is transferred to higher software layers. The reverse is true when the network layer receives a request from the higher software layers to establish a connection with another switching node.

Network layer 204 receives information from another node concerning a call via a LDC. As information is received on the LDC, a call reference number is utilized to identify the call associated with this message. The call reference number is selected by the originating network layer during call set up in accordance with the ISDN standard. Details of this identification are given with respect to FIG. 4.

Transport layer 205, is the key element that allows the routing of a call through a complex system having multiple nodes as illustrated in FIG. 1. Its primary function is to manage the routing of calls externally, i.e., between switching nodes. Transport layer 205 views the system of FIG. 1 in terms of nodes and is concerned with routing calls from its own node to other nodes or endpoints. (As explained in the detailed discussion of session layer 206, that layer, not transport layer 205, interprets logical destination information, such as a telephone number, to determine the destination node of a call and to establish an intra-node path by using the connection manager application.) In an overall system comprising multiple switching nodes such as switching node 101, the various transport layers communicate with each other in order to establish a call through the various switching nodes. This communication between transport layers is necessary because it may be necessary to route the call through intervening nodes to reach the destination node. The transport layers communicate among themselves utilizing signaling paths (LDCs) established between switching nodes.

With respect to inter-node routing, transport layer 205 is the first layer that starts to take a global view of the overall system illustrated in FIG. 1. Transport layer 205 uses information provided by session layer 206 to select the inter-node path. The transport layer performs its task of routing between various nodes by the utilization of tables defining the available paths and the options on those paths.

Communication between transport layers is done by network layer 204 using established LDCs. Transport layer 205 communicates information destined for its peers to network layer 204, and network layer 204 packages this information within the information elements, IEs, of standard ISDN Q.931 messages. Network layer 204 uses the LDC that has been set up to a particular node to communicate this information to its peer network layer. Similarly, when another network layer receives information of this type, the other network layer unpackages information and then directs the information to the transport layer.

The primary function of session layer 206 is to establish communication between endpoints with all endpoints considered to be applications including, for example, a BRI telephone. Significantly, in the present context these endpoints are applications such as the application performing the call processing features. In any event, connections between such endpoints is considered to be a call. A session is set up by session layer 206 any time two applications require communication with each other. As noted earlier, session layer 206 deals only in terms of switching nodes and applications on those switching nodes and relies on transport layer 205 to establish paths to other switching nodes. Session layer 206 identifies the called application by an address which previously in telecommunication was thought of as only a telephone number but has a much broader concept in the Q.931 protocol. From the address, the session layer determines the destination switching node. Then, session layer 206 sets up a call to the destination switching node by communicating with the session layer of the destination switching node. The communication with the other session layer is accomplished by having the session layer request its transport layer to place a call to the other switching node so that a connection can be made for a particular address. These requests are done using the network layer to generate standard ISDN Q.931 call setup messages. If the other switching node cannot interpret the address, the session layer of that switching node transmits information to its transport layer requesting that the call be dropped. If the session layer can interpret the address, it sends a message to its transport layer requesting that a call proceeding message be transmitted by its network layer back to the requesting switching node.

Presentation layer 207 of FIG. 2 invokes a complex protocol in order to groom the information being communicated between applications so that the applications are totally divorced from the protocol used to communicate the information. A presentation level protocol allows an application to communicate with a peer application across a transport path.

Finally, application layer 208 manages the resources needed by the applications running at layer 209. When an application at level 209 is communicating with another peer application, the application is unaware of how many other applications exist or where these other applications are located. It is the function of application layer 208 to determine and use such details, consequently allowing the applications to be written in a very abstract manner. At applications layer 209, thus far two applications have been discussed: the connection manager application and the call processing application.

Software Architecture Implementation—Overview

Figure 3:
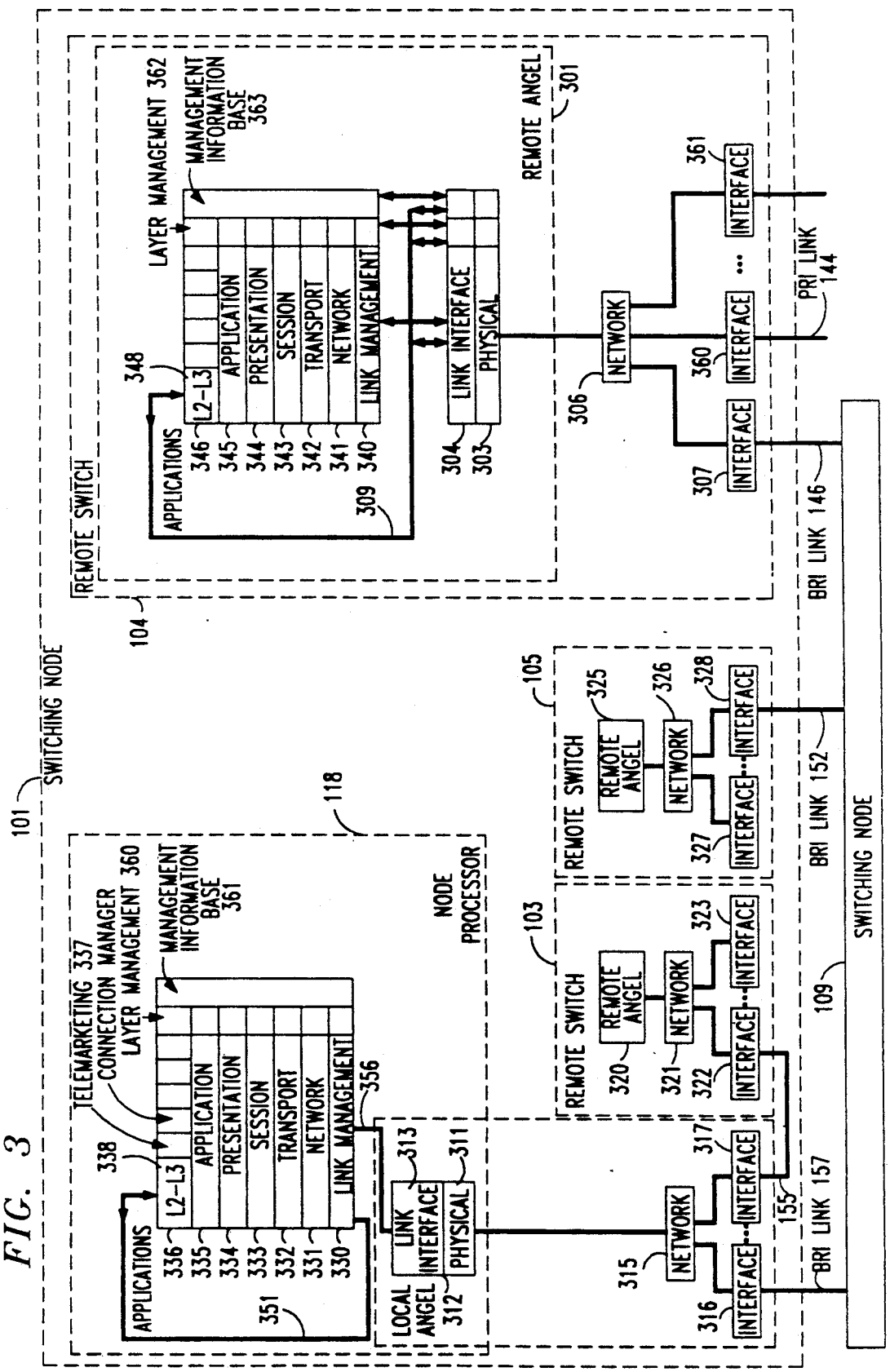
FIG. 3 illustrates, in block diagram form, the relationship between the software architecture and hardware elements illustrated in FIG. 1.

FIG. 3 illustrates in block diagram form the software architecture of FIG. 2 as implemented on switching node 101. This software architecture in accordance with the invention allows node processor 118 to control not only local switch 153 but also remote switches 103, 104, and 105 via the remote angels 301, 320, and 325. Software layers 201 through 209 are implemented on node processor 118 and each of the remote angels, such as remote angel 301. Specifically, the software layers 209 through 202 are realized by software layers denoted 336 through 313 in node processor 118 and software layers denoted 346 through 304 in remote angel 301. Physical layer 201 is jointly implemented by hardware and software. For example, the hardware portion of the physical layer for local switch 153 is implemented by interfaces 316 through 317, and the software portion is performed by layer 311. Local angel 312 is implemented on node processor 118 using distinct software modules. Remote angels 320, 325 and 301 are implemented on stand alone processors.

In accordance with the invention, the link interface layers in the remote switches communicate all signaling and control information to the link management 330 of node processor 118 for all interfaces and networks of the remote switches except those interfaces utilized to set up and control the ISDN links used to communicate the signaling and control information to node processor 118. Software layers down to the link management layer in the remote angels are executed only to setup and control the ISDN links used to communicate the signaling and control information. Further, this information is communicated via a packetized channel between two applications (referred to as L2-L3 applications) established in node processor 118 and a remote angel (i.e. remote angel 301). In response to such information, L2-L3 application 338 of node processor 118 recovers this information and inserts it into link management 330 for processing by higher software layers. When the higher software layers of node processor 118 transfer signaling and control information to remote angel 301, for example, the information is first transferred to link management 330 which relays it to L2-L3 application 338 via path 351. The latter application transmits the information to L2-L3 application 348 via the packetized channel. In response, L2-L3 application 348 transfers the information to link interface 304 via path 309. Link interface 304 then process the information as if it had come from link management 340.

Software Architecture Implementation—Detailed View

Consider now in greater detail how the packetized channel is setup and utilized for control of remote switches. In the previous example, this packetized channel was established between L2-L3 application 348 in application layer 346 and L2-L3 application 338 in application layer 336 via path 309, layers 303 and 304, network 306, interface 307, BRI link 146, switching node 109, BRI link 157, interface 316, network 315, local angel 312, and path 356. There are four embodiments for establishing this packetized channel: (1) a packetized B channel, (2) a logical link of a D channel, (3) a communication path utilizing user-user temporary signaling information on an LDC using standard ISDN signaling, and (4) a packetized subchannel of a B channel.

In the first embodiment, a packetized channel is established between L2-L3 application 348 and L2-L3 application 338 by establishing a LAPD packet protocol on a B channel of BRI links 146 and 157. Information received via this packet protocol is directed to L2-L3 applications 338 and 348 by link interfaces 313 and 304, respectively. Each node processor and remote angels in the remote switches of FIG. 1 has an administered telephone number which is only used for performing network setup functions. When remote angel 301 is initialized, L2-L3 application 348 looks in an internal table and selects the primary node processor which is node processor 118. Associated with this primary processor table entry is the telephone number for node processor 118. L2-L3 application 348 uses the administrated telephone number of node processor 118 to initially request that software layers 341 through 343 transmit a setup message with the telephone number in the calling party number field to switching node 101. By transmitting the setup message, L2-L3 application 348 is placing a call to L2-L3 application 338.

The setup message is transmitted in the D channel of BRI link 146, which had previously been established when BRI link 146 was initialized to switching node 109. Switching node 109 processes this request in a normal manner with respect to both switching node 101 and remote switch 104 and retransmits the request to switching node 101. L2-L3 application 338 answers this call, and messages are transmitted back and forth as if a human being had answered the call on a convention telephone set. Initially, the setup message is transferred to network layer 331. Network layer 331 transfers the setup message to session layer 333 via transport layer 332. When the setup messages are received, session layer 333 handles this call in the same manner as it would any other call. Session layer 333 is responsive to the telephone number to determine that it is directed to L2-L3 application 338 as an endpoint and transfers the setup message to the application layer 335. Application layer 335 examines the dialed number in the called party number field and, based on that, transfers the call setup message to L2-L3 application 338.

If L2-L3 application 338 chooses to accept the call upon receipt of the call setup message, L2-L3 application 338 transmit down to the lower software layers a request that a B channel be established and that an acknowledgement message be sent. In response, network layer 331 formulates a connection message that is then transferred back to remote switch 104 via switching node 109. Network layer 331 also negotiates with switching node 109 for a B channel. Switching node 109 is responsive to the connection message to interconnect the negotiated B channel from BRI link 157 to the previously selected B channel of BRI link 146. If L2-L3 application 338 decides not to answer the message, then network layer 331 tears the call down by sending the proper messages to remote angel 301 and switching node 109.

After requesting the transmission of the connection message, L2-L3 application 338 transmits a request via link management 330 to establish the packetized channel on the selected B channel. In response, link management 330 requests that local angel 312 control interface 316 so that interface 316 establishes a packetized channel on the designated B channel of BRI link 157 and that link interface layer 313 establish a mode 3 LAPD protocol on the packetized channel. In addition, link management 330 designates that the information from this packetized channel is to be directed to L2-L3 application 338.

After receiving the connection message, L2-L3 application 348 in remote angel 301 also establishes a packetized channel on the designated B channel of BRI link 146 in a manner similar to that utilized by L2-L3 application 338. In addition, L2-L3 application 348 transmits information down to the management information base 363 part of layers 304 that results in link interface 304 transmitting all information received from interfaces 360 and 361 connected to network 306 directly to L2-L3 application 348 via path 309. In accordance with the invention, L2-L3 application 348 is responsive to this information to transmit it via the packetized channel established to L2-L3 application 338. Similarly, L2-L3 application 348 is responsive to information received from L2-L3 application 338 to communicate this information to link interface 304 via path 309. The result is that the interfaces 360 through 361 are controlled by the high-level structure of node processor 118 starting with link management 330.

Consider now the example where BRI link 146 fails which is detected by interface 307 in accordance with standard ISDN error detection procedures. In this event, node processor 118 can no longer control interfaces 360 through 361 via layers 303 and 304 in remote angel 301. When this occurs remote angel 301 reinitializes itself, and L2-L3 application 348 places another call to node processor 118 using another data link, i.e., such as BRI 145. A packetized channel is set up on BRI 145 via switching node 109 in the same manner as previously described. Similarly, remote angel 320 could also set up a connection through switching node 109 utilizing the links illustrated in FIG. 1 which interconnect remote switch 103 through switching node 109 to local switch 153 which is interconnected to node processor 118.

Figure 4:
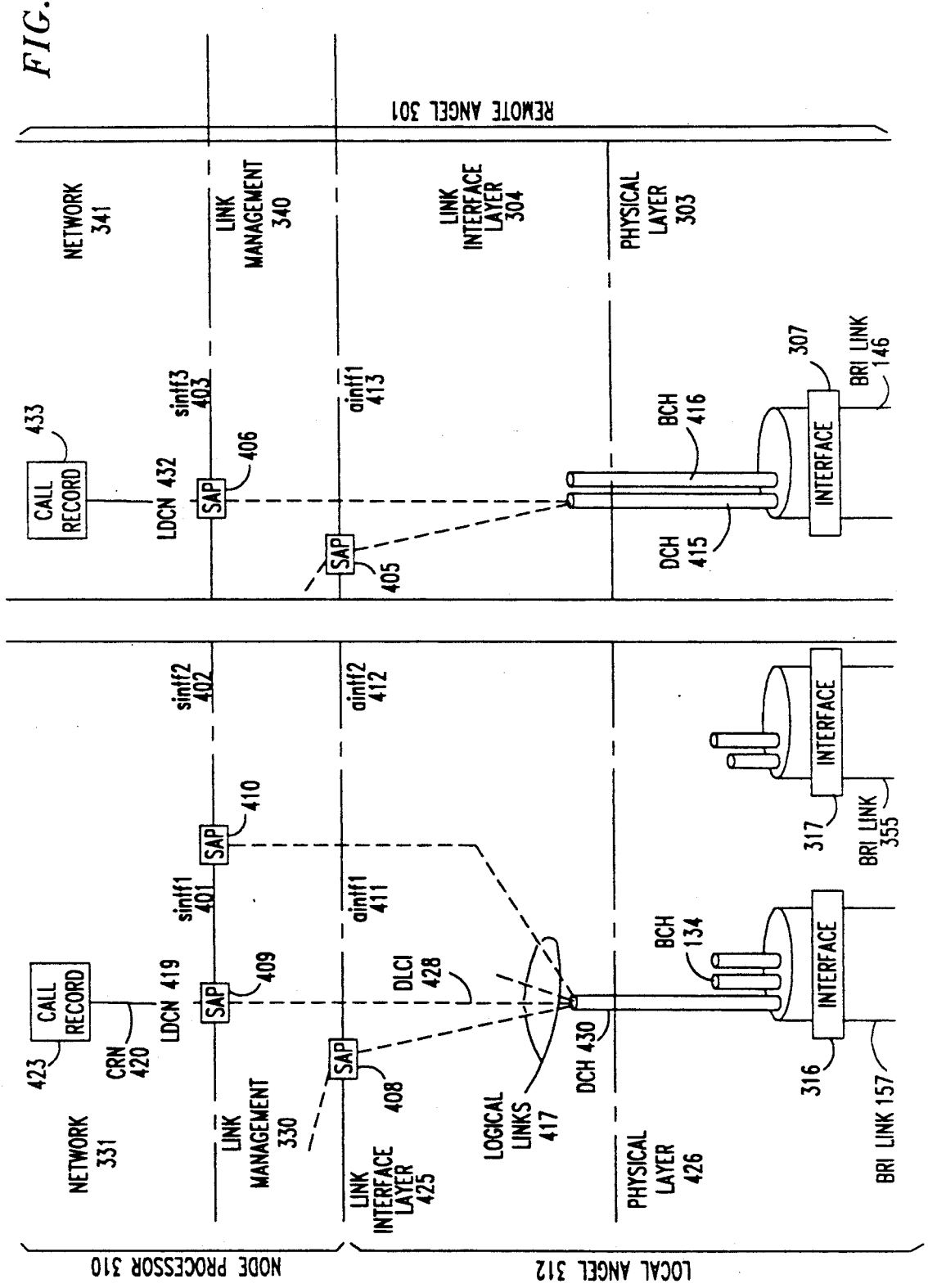
FIG. 4 logically illustrates the signaling and transport paths that are set up within a switching node.

FIG. 4 logically illustrates the general relationships between data link connection identifiers (DLCI), service access point identifiers (SAPI), terminal end identifiers (TEI), system interface numbers (sintf), switches, angel interface numbers (aintf), logical D channel Numbers (LDCN), call reference numbers (CRN), and the various software layers. FIG. 4 also logically illustrates the termination and control of interface 316 and interface 307 before the establishment of the packetized channel interconnecting L2-L3 applications 336 and 346. As illustrated in FIG. 4, each pair of link interface and physical layers is implemented on different angels. Link interface layer 425 and physical layer 426 are implemented on local angel 312, and link interface layer 304 and physical layer 303 are implemented on remote angel 301 as illustrated in FIG. 3. Node processor 118 implements link management 330 and network layer 331 plus higher layers, and remote angel 301 implements similar layers, with respect to interface 307 only. However, in accordance with the invention, if BRI link 146 fails and PRI link 144 must be used for communicating L2-L3 signaling, interface 360—which terminates link 144—will be controlled by layers 340 through 346. The sintf and aintf numbers correlate to physical interfaces. The sintf numbers are utilized by network layers and higher layers to identify physical interfaces. For example, network layer 331 views the physical interfaces as being identified by sintf1 401 and sintf2 402. Link management 330 makes a conversion between the sintf numbers and the aintf numbers which together represent the physical interface. Network 341 performs a similar function with respect to sintf3 403 and aintf1 413. There is a one for one correspondence between an aintf number and a sintf number. These latter numbers identify specific interfaces, and each interface has a number of channels. For example, a PRI link has 24 channels, and a BRI interface has three channels.

A network layer identifies the channels associated with a particular sintf number by using actual physical channel numbers, and similarly a link interface utilizes the physical channels numbers in association with an aintf number. This is possible because specifications of the ISDN standard designate that physical channel 24 for a PRI link is used to perform signaling and that physical channel 3 of a BRI link is used to perform signaling. A network layer and higher layers utilize sintf numbers in order to control link interface and physical layers to interconnect physical channels and to create specific protocols on these channels. The manner in which channels are interconnected through physical networks such as network 315 is not illustrated in FIG. 4 but this interconnection is done at the physical layer such as physical layer 426.

FIG. 4 logically illustrates the manner in which D channel 430 is subdivided so as to provide the necessary flow of information to implement LDCN 419. Note, LDCN 432 is similarly implemented. At physical layer 426, all channels are treated alike. To implement LDCN 419, link interface layer 425 under control of higher layers first establishes a LAPD packet protocol on D channel 430 which is channel 3 of BRI link 157. The LAPD packet protocol creates a plurality of logical links 417 each of which is identified by a DLCI number such as DLCI 428. A DLCI number is based on the TEI and SAPI numbers with each pair of TEI and SAPI numbers designating one DLCI or logical link. The protocol allows for 128 TEI numbers and 63 SAPI numbers. D channel 415 is subdivided in the same manner as D channel 430.

In accordance with the ISDN specification, a physical link can be considered as point-to-point or point-to-multi-point. By convention, a PRI link may only be point-to-point resulting in only one TEI number being allowed on the D channel of a PRI link. A BRI link may be point-to-point or point-to-multi-point resulting in a D channel of a BRI link potentially having more than one TEI number. In accordance with the ISDN specification, four of the SAPI numbers of a D channel are predefined as 0 for call control (LDC), 16 for implementing a X.25 protocol, 1 for a packet mode connection, and 63 for peer-to-peer communication between link management layers. In FIG. 4, SAP 408 has the value of 63 and is used by link management 330 for communication with its peer which is in the present case is remote angel 301. Similarly, SAP 405 is used by link management 340 on remote angel 301 for the peer-to-peer communication with node processor 118. SAP 409 has a value of 0 and is used to implement LDCN 419. Similarly, SAP 406 implements LDCN 432. All signaling is controlled via LDCNs 419 and 432 for interfaces 316 and 307, respectively. Upon receiving a SAPI of 0, link management 330 directs this logical link to SAP 409 which is used by network layer 331 to implement LDCN 419. Management layer 340 functions in a similar manner. In accordance with the ISDN specification, call reference numbers are included in the Q.931 protocol and are received via LDCNs 419 and 432.

These reference numbers are utilized to identify call records such as call records 423 and 433. For example, CRN 420 identifies call record 423. There is one call record for each channel that is engaged in a circuit switched or packetized call on a physical interface. Link management 330 utilizes sintf1 401 to associate LDCN 423 with call record 423. Link management 340 performs a similar function with respect to LDCN 432 and call record 433. At the network layer, CRN numbers are only unique with respect to an individual LDCN.

Figure 5:
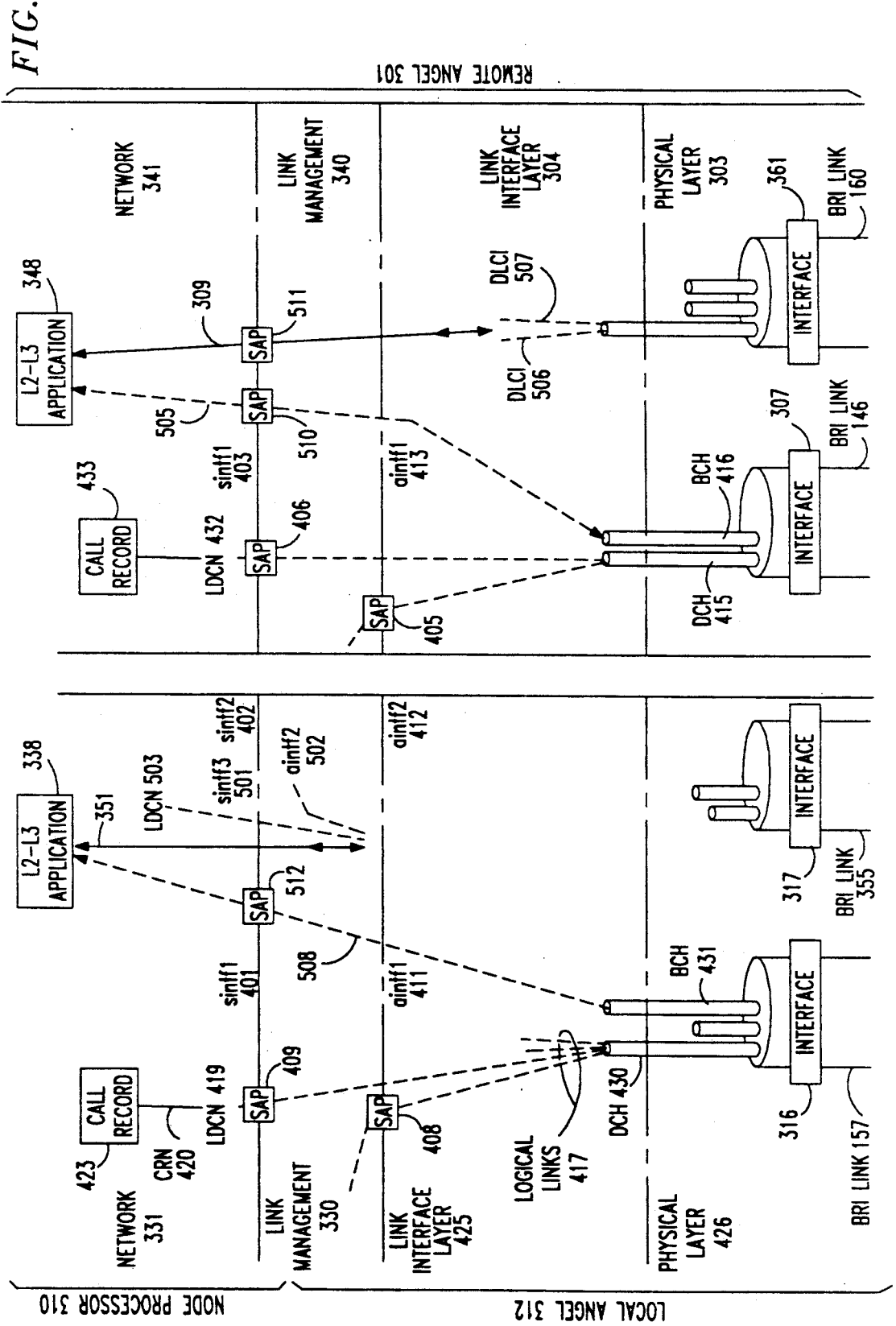
FIG. 5 logically illustrates a process for establishing a physical interface.

FIG. 4 illustrates that BRI link 157 and BRI link 146 have come up on their respective interfaces and have had the LDC channels established. At this point in time, remote angel 301 is functioning in an identical manner to node processor 118 and is responsible for all functions of the higher software layers including link management 340 and above. FIG. 5 illustrates the logical interconnection of channels after the L2-L3 applications 338 and 348 are communicating over the packetized channel.

To establish the conditions illustrated in FIG. 5, L2-L3 applications 338 and 348 must first establish a LAPD packetized connection on B channels 431 and 416, respectively. The information from these packetized channels is directed to and from B channels 431 and 416 via paths 508 and 505 (SAPs 512 and 510) directly to applications 338 and 348, respectively. After this packetized channel is set up, remote angel 301 directs all information being received by link interface layer 304 for all interfaces, except for interface 307, to application 348 via path 309 (SAP 511). For example, the information being transferred or received on DLCIs 506 and 507 from interface 361 is directed to application 348 via path 309. All information to control interface 361 is transmitted by application 348 to link interface layer 304 because all software layers above link interface layer 304 are provided by software layers 330 through 336 on node processor 118. The information is communicated to and from these higher level software layers on node processor 118 via path 508 (SAP 512) through B channels 431 and 416 and path 505 (SAP 510) to application 348 which in turn communicates the information to link interface layer 304 via path 309. However, interface 307 continues to be controlled exclusively by software layers in remote angel 301. As additional interfaces are brought up on remote angel 301, they are treated in the same manner as interface 361.

Figure 6:
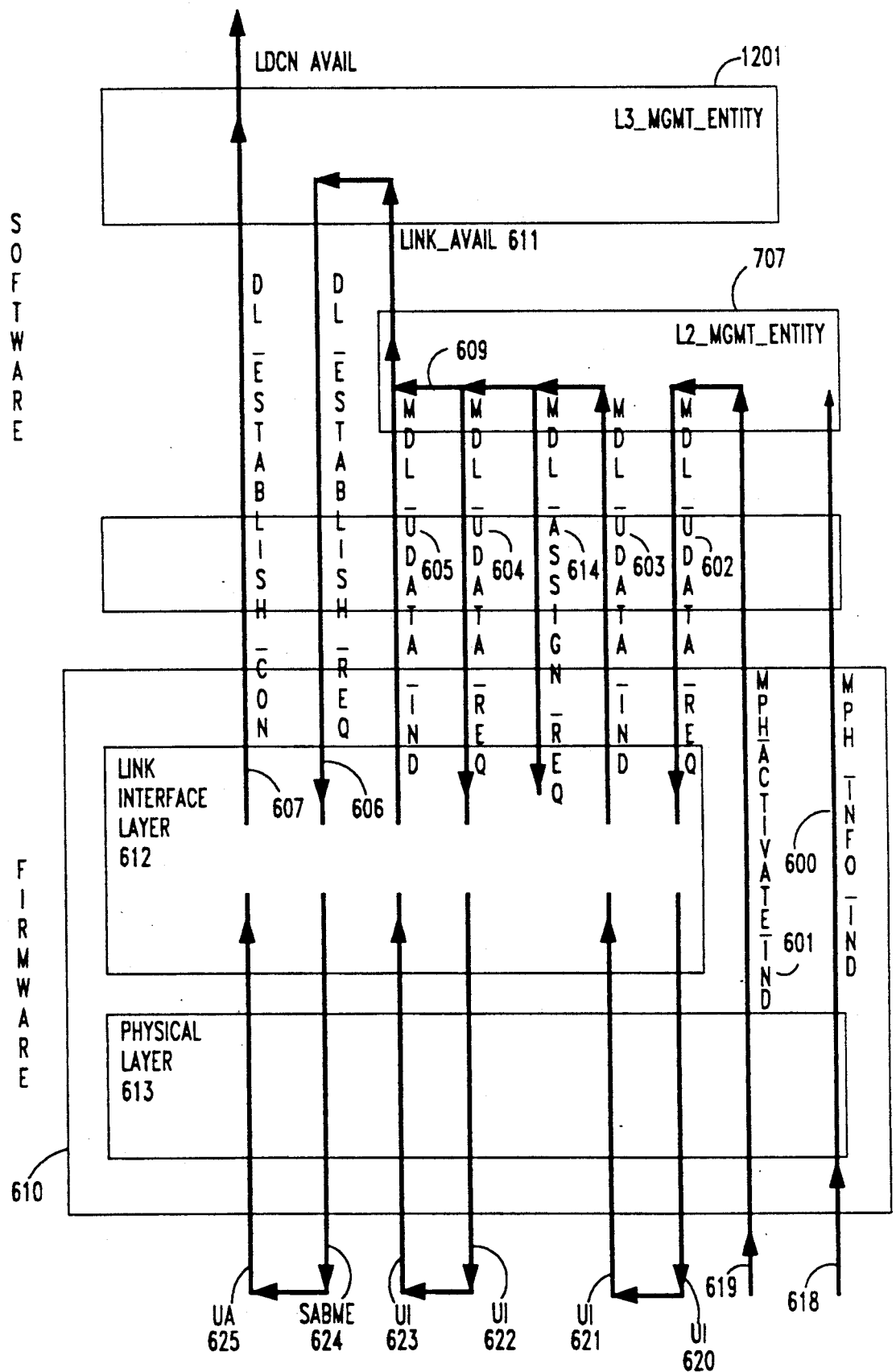
FIG. 6 logically illustrates a process for establishing a FRI link.

FIG. 6 illustrates the messages that are exchanged in bringing up an interface on a switching node such as switching node 101. First, consider FIG. 6 from the point of view of physical interface 316 of FIG. 3 which is being bought up. Remote switch 104 brings up interface 307 in the same manner. Initially as an interface port is plugged in (path 618), physical layer transmits the mph_info_ind 600 primitive which is directed to L2_MGMT_ENTITY 707 (a level 2 management entity which is described in detail with respect to FIG. 7). Note, the service access point (SAPI) number is a 63 for a MDL primitive and a zero for a DL primitive. Primitive 600 also includes the aintf which the angel selects. The aintf is the reference used by L2_MGMT_ENTITY 707 to refer to that interface. Primitive 600 also defines the type of interface, such as a PRI, BRI or FRI link, that has been brought up. Note, that the mnemonics indicate where the message is from and where it is going. MPH means that the message is between the physical layer and the level 2 management entity, MDL indicates that message is between the level 2 management entity and the LAPD part of link interface layer 612, and DL indicates that message is between level 3 and the LAPD portion of link interface layer 612.

When physical layer 613 detects framing (path 619) being received on the interface, physical layer 613 communicates this fact to entity 707 by the transmission of MPH_ACTIVATE_IND 601 primitive. To completely respond to primitive 601, entity 707 needs to establish with the other interface the terminal endpoint identifier (TEI). The TEI is determined through negotiations with the other interface. To accomplish this negotiation, entity 707 communicates with its peer level 2 management that is controlling the other interface. For example, assume that the indication on path 619 resulted from a BRI interface becoming active by a telephone being plugged into the BRI interface. Most BRI telephones are programmed to negotiate the TEI specified by the ISDN standard in response to Q.921 messages received via the BRI interface. If the active interface is not a BRI interface which supports the automatic TEI procedures, primitives 602 and 603 are not exchanged. Entity 707 starts the TEI negotiation by sending the MDL_UDATA_REQ 602 primitive that contains a TEI selected by entity 707 to layer 612. In response, layer 612 transmits UI 620 (unumbered frame). The peer entity responds to UI 620 via its interface with UI 621 that contains an indication of the peer entity's agreement with TEI selected by entity 707. In response to UI 621, link interface layer 612 inserts the indication into MDL_UDATA_IND 603 primitive. The CCITT specification allows for other commands at this point that allow for further negotiation of the TEI if entity 707 selected a TEI that was already being used by the telephone.

Entity 707 responds to primitive 603 by transmitting MDL_ASSIGN_REQ 714 primitive to link interface layer 612. This primitive contains information requesting that link interface layer 612 make an allowance for every possible SAPI identifier that can be associated with the negotiated TEI. As explained with respect to FIG. 4, the SAPI defines how a logical link is being used; whereas, the TEI simply identifies a terminal on the other side. The request for link interface layer 612 to make allowance for SAPI identifiers makes provision for entity 707 to establish these SAPI identifiers at a later point.

Now, entity 707 transmits a MDL_UDATA_REQ 604 primitive whose information contains the address of a specific TEI and the node number of node 101. Primitive 604 is converted by layer 612 to UI 622. The reason for sending the node number using primitive 604 is to determine whether the other peer entity is on a switching node such as switching node 101. The other entity may also be on a public network or a BRI telephone. In response to UI 622, if the other entity is on a node, it responds with its node number by the transmission of UI 623 whose information includes the other entity's node number. Layer 612 responds to UI 623 by transmitting MDL_UDATA_IND 605 primitive. If the other entity is not a node, it fails to recognize UI 622 and does not respond, resulting in a time out. In response to the time out, entity 707 via path 609 communicates LINK_AVAIL 611 primitive to entity 1201 which is described in greater detail with respect to FIG. 11. At this point, entity 707 has accomplished the following functions: framing has been established, the TEI has been identified, link interface 612 has been advised to prepare for the establishment of different services via SAPI identifiers such as signaling, an attempt has been made to exchange node numbers, and the determination has been made that the interface is now ready to be used by higher layers. Entity 707 now advises entity 1201 via the LINK_AVAIL 611 primitive that the interface is now ready for use and whether or not the interface is a switching node.

Entity 1201 has to determine whether to establish a signaling link with the other entity. If entity 1201 already has a signaling link to the other peer entity in another switching node, entity 1101 does not precede with primitives 606 and 607. Entity 1201 has a signaling link with the other entity if the switching node of the other peer entity has an established interface with switching node 101. If entity 1201 needs to establish signaling, entity 1201 transmits a DL_ESTABLISH_REQUEST 606 primitive which contains information requesting that a signaling link be established to the other entity. Layer 612 converts primitive 606 to SABME 624. If the other entity agrees, it transmits UA 625 back which layer 612 converts to DL_ESTABLISH_CON 707 primitive. After receipt of primitive 607, entity 1201 transmits a LDCN_AVAIL message to transport layer 332 advising the transport layer that a new LDC has become available.

In forming the DL_ESTABLISH_REQUEST 606, entity 1201 uses the node number received in LINK_AVAIL 611 primitive to determine the position of the new node within the node system. Each node has a unique node number, and the number itself determines the position within the node system. In addition, this information is utilized to decide which entity is going to be the user or the network on a PRI interface. If this relationship is not correct on a PRI link, the link will not become operational. Before the transmission of DL_ESTABLISH_REQUEST 606, the signaling link has not yet been established so that the determination of user and network has not been made. Primitives 601 through 605 occur before any LAPD link is established. For this reason, all the frame commands are unnumbered. This frees the entities from having to determine the network and the user destinations. Before the transmission of primitive 606, entity 1201 compares the node numbers and from this comparison determines which of the entities will be defined the user or the network. For other entities such as the public network, this destination is specified. If the other entity is unknown with respect to being a network or a user, entity 1201 initially tries to come up as a user when transmitting out primitive 606. If this fails, entity 1201 determines this after a timeout period is exceeded. If a timeout occurred, entity 1201 then transmits out a second primitive 606 designating itself as the network.

Consider now how interface 361 is brought up by remote angel 301 and node processor 118. When the interface 361 is brought up the same primitives illustrated in FIG. 6 are exchange but the software layers are split between remote angel 301 and node processor 118. Link interface layer 612 and physical layer 613 are implemented on remote angel 301, but the other software layers illustrated in FIG. 6 are implemented on node processor 118. Consequentially, primitives 600 through 607 are communicated between link interface layer 612 and link management 330 via path 309, L2-L3 application 348, logical link 505, B channels 416 and 431, logical link 508, L2-L3 application 338, and path 351 of FIG. 5.

Figure 7:
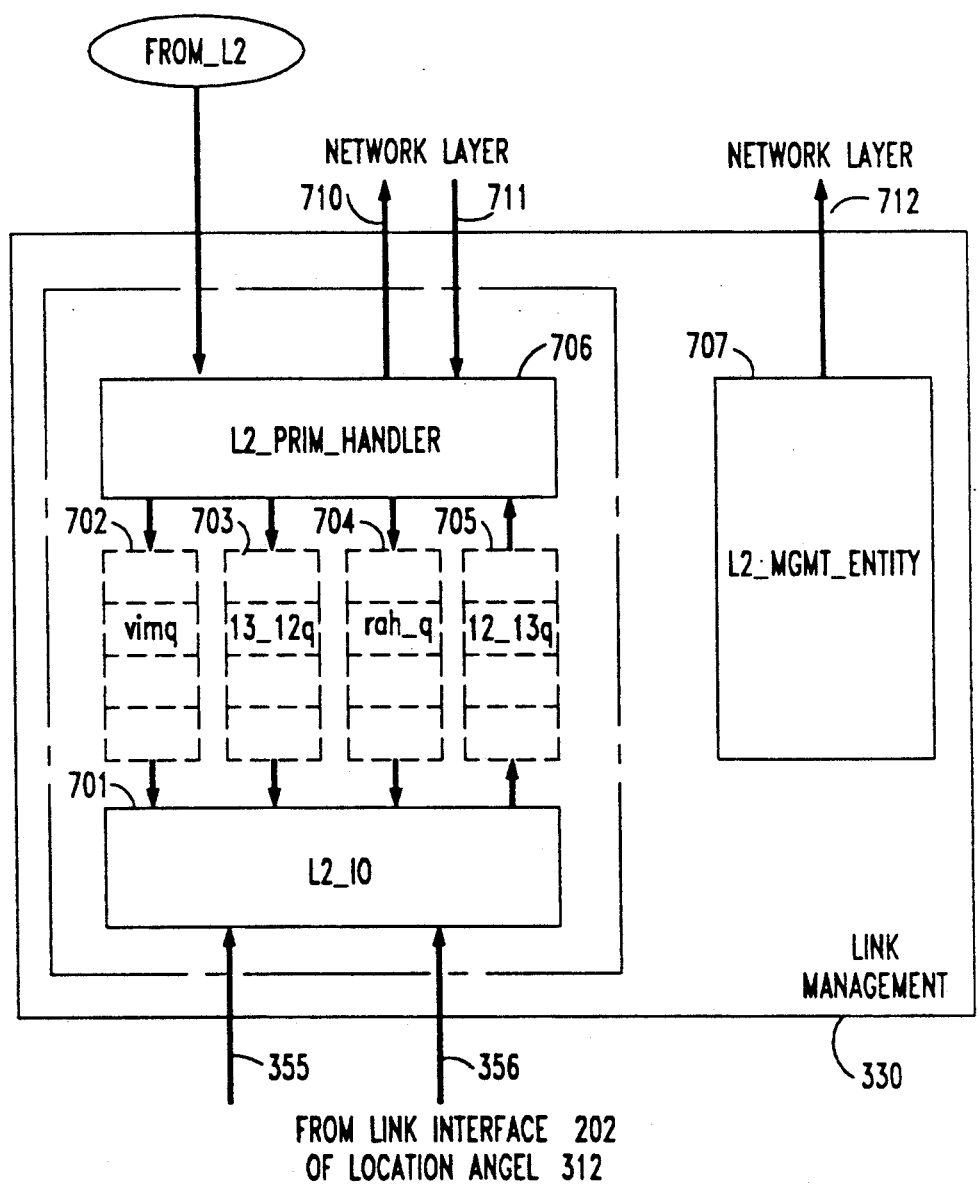
FIG. 7 illustrates a software architecture for a link interface.

Link management 330 is shown in greater detail in FIG. 7. Link management 330 consists of blocks 701, 706, and 707 and queues 702 through 705. Using queues 702 through 705, L2_IO 701 communicates data with link interfaces similar to link interface 202. L2_PRIM_HANDLER 706 is concerned with receiving and placing information into queues 702 through 704 from network layer 331. Block 706 also makes the determination of whether information should be transferred to network layer 331 or to L2_MGMT_ENTITY 707. In addition, block 706 performs the mapping between the sintf number and the angel and aintf number. L2_MGMT_ENTITY 707 is concerned with performing the functions of layer management 210 at the link management level.

Figure 8:
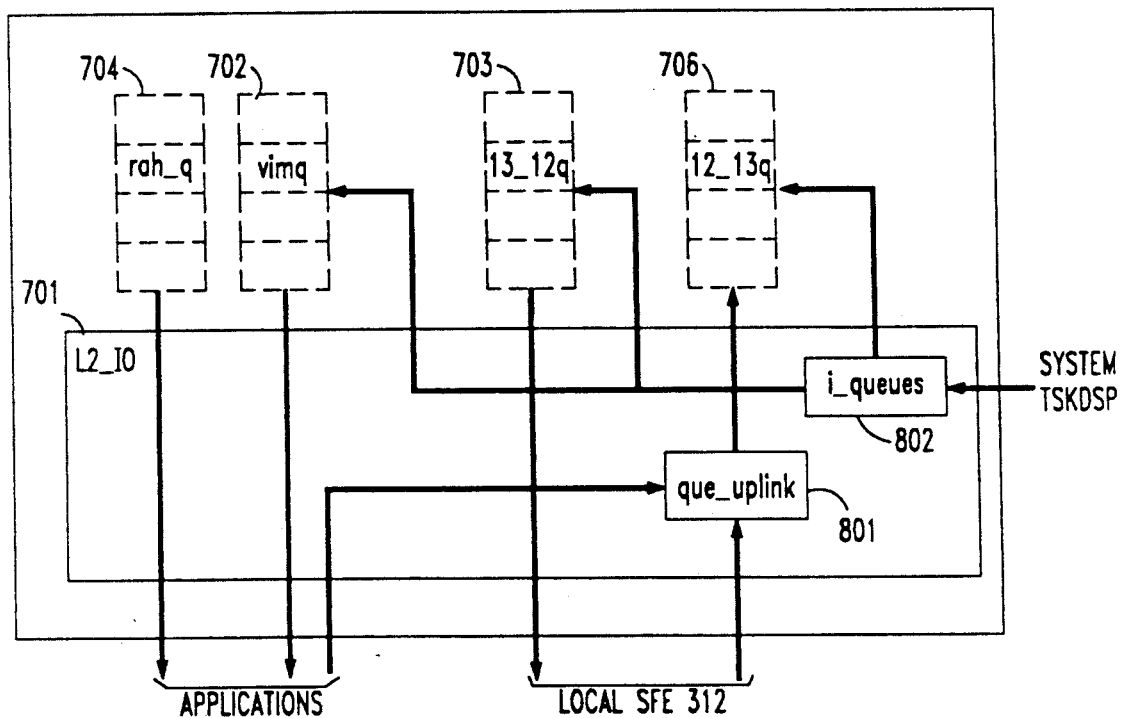
FIGS. 8 through 10 illustrate, in greater detail, the software architecture for a link interface.

L2_IO 701 is illustrated in greater detail in FIG. 8. Que_uplink 801 transfers information received either from a virtual interface manager (VIM) application and VIM angel, L2-L3 application, or local angel into 12_13q 705. The VIM application and VIM angel are used to implement virtual links with other terminals and switching nodes. The operation and purposes of the VIM application and angel are described in detail in our copending U.S. patent application Ser. No. 07/636,528, of B. M. Bales, et al., filed of even date herewith and entitled "Transparent Communication of Control Information Through a Switching Network". This application is hereby incorporated by reference.

The L2-L3 application handles the L2-L3 function, the communication handler function, and the layer management which are running in the remote angels. Information flows directly from queues 702 through 704 to either the applications or the local angel. The queues are initialized by i_queues 802 under control of the system task dispenser. Blocks 801 and 802 are subroutines which are called by the appropriate entities.

Figure 9:
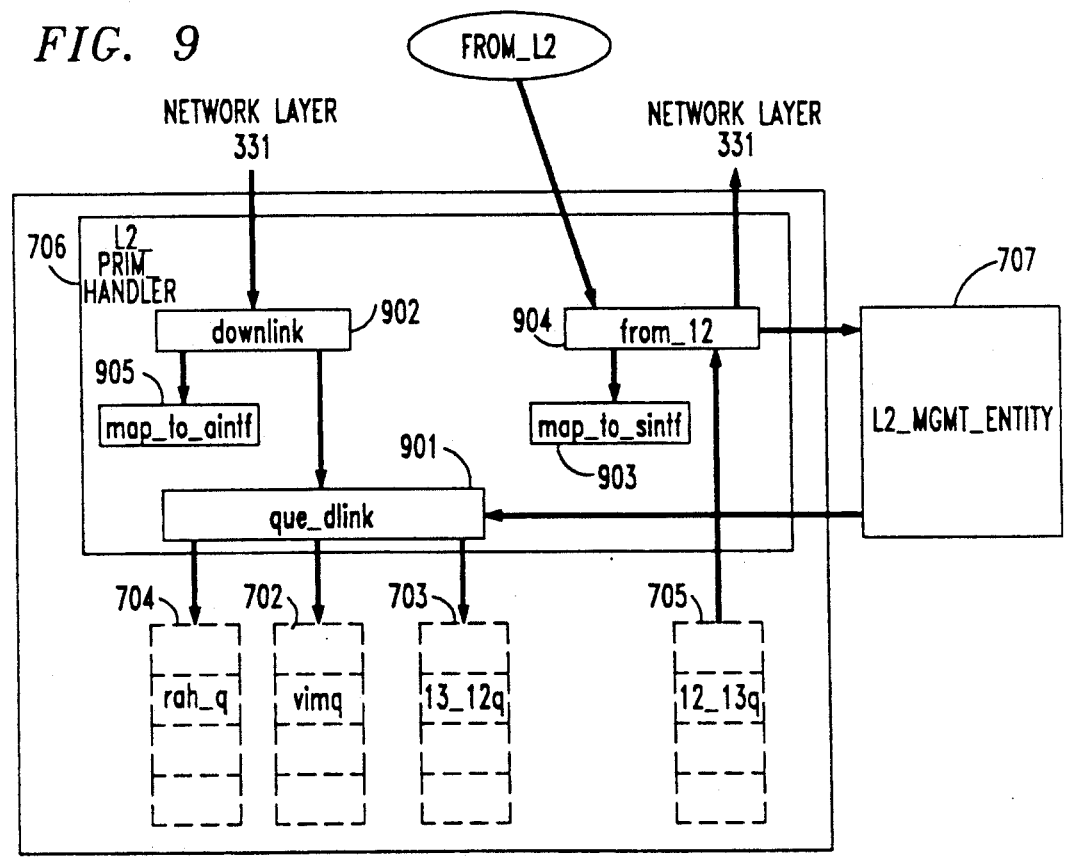

L2_prim_handler 706 is illustrated in greater detail in FIG. 9. With respect to data received from the different angels, blocks 706 determines whether this information should be transferred to network layer 331 or L2_MGMT_ENTITY 707. This function is performed by from_12 904 which reads the primitives contained in queue 705. Note that block 904 is periodically invoked by the system task dispenser to remove primitives from queue 705 (this is indicated by oval 906). Block 904 makes the decision of where to transfer the primitives stored in queue 705 by examining these primitives. If the primitive starts with a DL mnemonic, the primitive is to be transferred to network layer 331; if the primitive starts with a mnemonic of MDL or MPH, the primitive is to be transferred to L2_MGMT_ENTITY 707. The primitives transferred to or from L2_MGMT_ENTITY 707 are in three general classes. The first of these classes is information concerning the physical status of links in switching node 101. The second class is signaling being received from another link management layer in another node. An example of the second class is the signaling that occurs between remote telemarketing terminal 104 and switching node 101 as described with respect to FIG. 5. With respect to second class, the overall function provided by l2_MGMT_ENTITY 707 is to negotiate with its corresponding peer to establish node numbers and to bring up an interface. The third class is the control of the interfaces within switching node 101.

Returning to FIG. 9, if from_12 904 determines that the primitive is not to be transferred to block 707 of FIG. 9, block 904 maps the angel and aintf numbers to the sintf number by invoking map_to_sintf 903. After obtaining the sintf, from_12 904 transfers the primitive to the network layer 331. Messages coming from network layer 331 are first processed by downlink 902 which invokes map_to_aintf 905. The latter subroutine converts the sintf number to the angel and the aintf numbers. Once the angel and aintf numbers have been obtained, downlink 902 invokes que_dlink 901. Also, downlink 902 converts the message protocol received from network layer 331 into an intra-link level protocol resulting in primitive. Subroutine 901 then places the primitive in queues 702, 703, or 702 based on the angel number.

Figure 10:
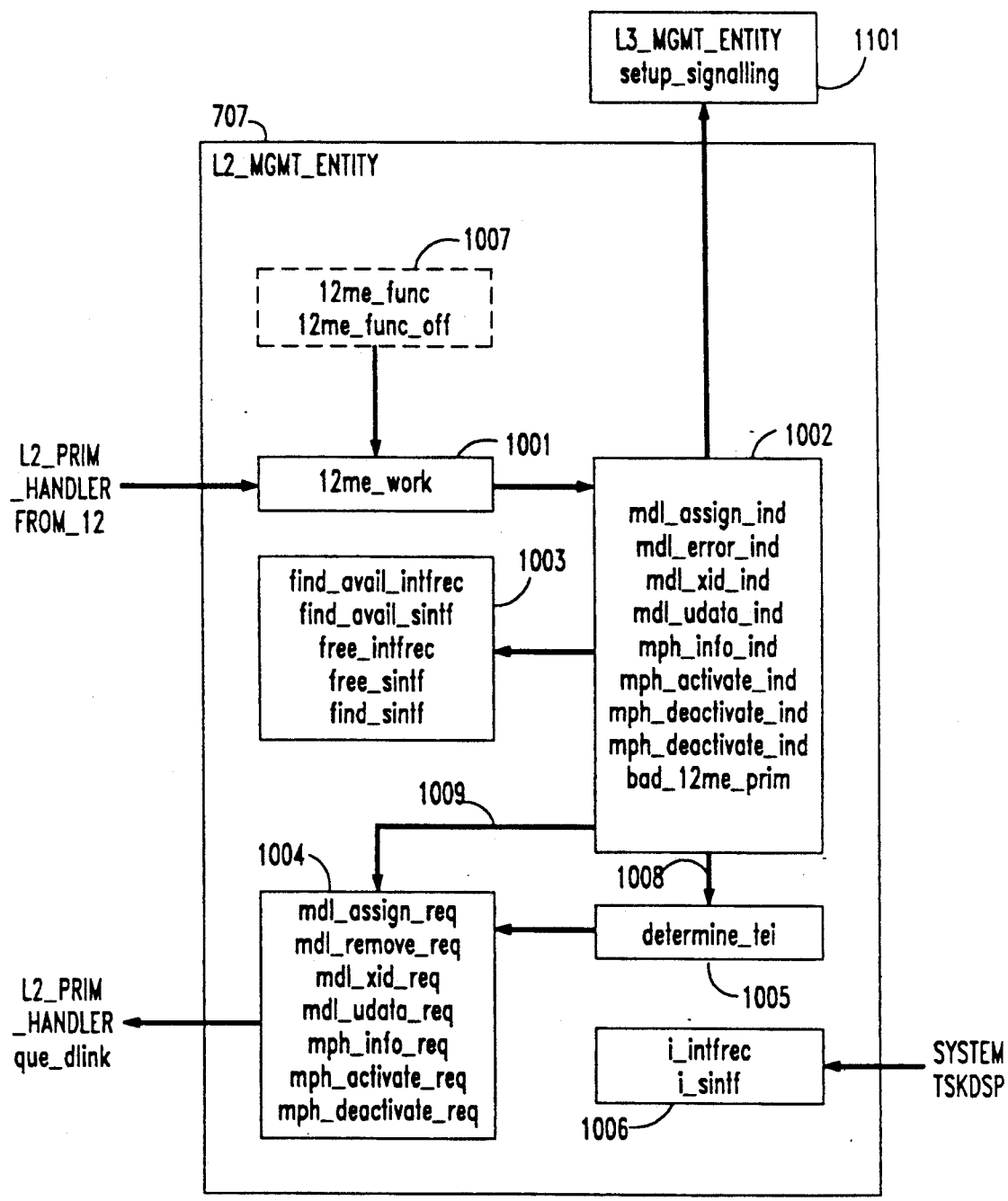

Now consider information which is being received by que_dlink 901 from L2_MGMT_ENTITY 707 as illustrated in FIG. 9. In explanation of the type of information that is being transferred from block 707 to subroutine 901, reference is now made to FIG. 10. During initialization of an interface, block 1001 activates certain subroutines in block 1002. Once activated, these subroutines activate other subroutines in block 1004. The subroutines in block 1004 transmit messages to the physical or virtual interface being initialized. Examples of subroutines in block 1002 activated by messages from an interface to transmit messages back to the link interface via block 1004 is given with respect to FIG. 5. For example, when node numbers are to be exchanged, subroutine MDL_UDATA_IND of block 1002 is activated which in turn activates subroutine MDL_UDATA_REQUEST of block 1004. In addition, the subroutines of block 1002 utilize the subroutines of block 1003 to find sintf and intfrec numbers. L2_MGMT_ENTITY 707 assigns the sintf numbers when a new interface is established and allocates memory for the interface within management information base 211. In addition, entity 707 frees sintf numbers when an interface is discontinued. The functions of entity 707 are performed in conjunction by subroutines in blocks 1002 and 1003 of FIG. 10. Block 1006 is utilized by the system task dispenser to initialize the intfrec and sintf numbers. In addition, some of the subroutines in block 1002 can transmit information up to the 13 management entity (L3_MGMT_ENTITY 1201 shown in FIG. 12)

Figure 11:
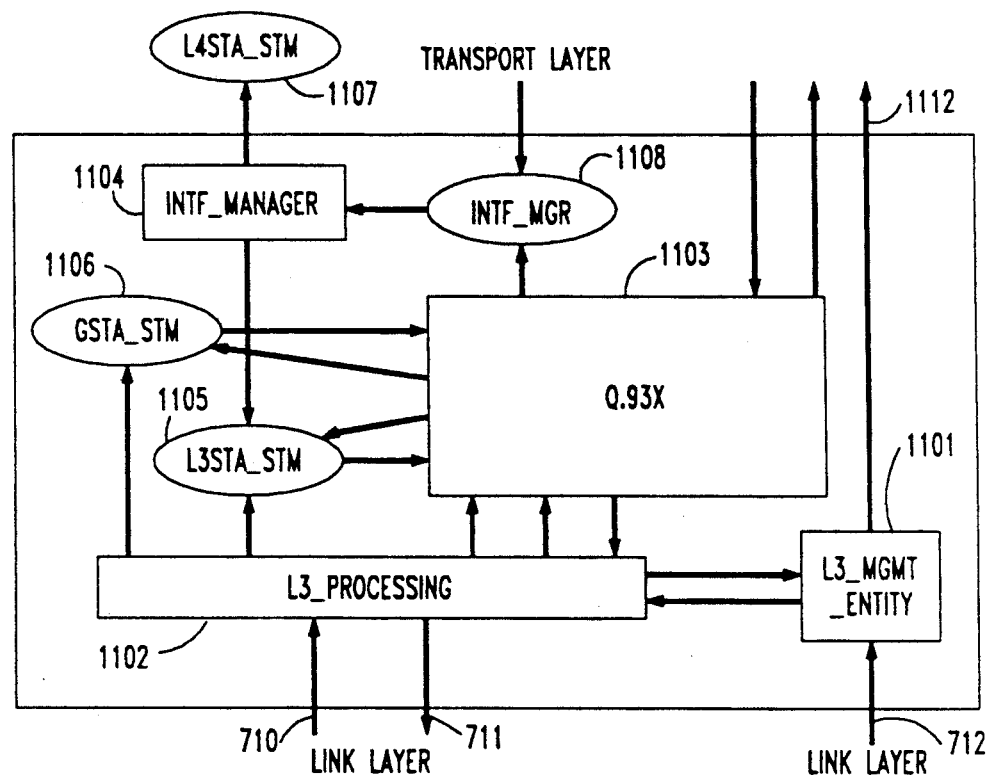
FIGS. 11 and 12 illustrate, in greater detail, a software architecture for a network layer.

FIG. 11 illustrates a detailed block diagram of network layer 204. There are two paths flowing between layers. One is a signaling path which is designated as paths 710 and 711, and the other one is a management information path which allows management entities to communicate and is designated as paths 712 and 1112. An example of management information stored in the management information base 211 is the sintf number which is inserted by entity 707, but the sintf is also used by different management entities in higher layers. Another example is the framing indication for an interface which is placed in the management information base 211 by entity 707. The management entity of the transport layer utilizes this framing indication to determine whether or not it has a transport connection to a particular node.

In FIG. 11, L3_PROCESSING 1102 is responsible for communicating signaling information to and from link management 330. L3_MGMT_ENTITY 1201 is responsible for establishing and removing signaling paths which are used for connections. For example, block 1201 initially transmits the setup message to initiate the setting up of a call. This message is transferred down to link management 330 for transmission. Q.931 block 1103 is responsible for all protocol handling. INTF_MANAGER 1104 is responsible for interfacing with transport layer 332.

Figure 12:
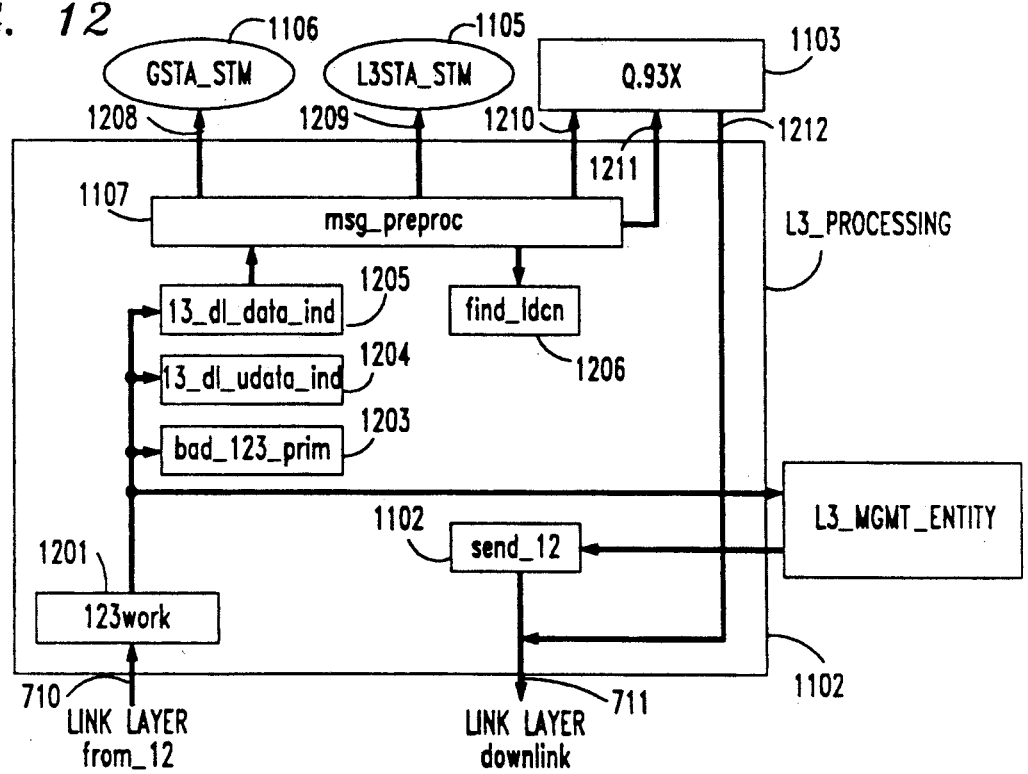

L3_PROCESSING 1102 is illustrated in greater detail in FIG. 12. Note that with respect to bringing up a VIM interface which implemented by the VIM angel, L3_MGMT_ENTITY 1201 considers a VIM interface as a physical entity when it is setting up a flexible rate interface (FRI) LDC, since the VIM application and VIM angel are capturing set up information from block 1201 and then retransmitting this information down the software layers. The VIM application and angel are described in detail in the above referenced copending application. As information is received from link. management 330, 123work 1201 decides whether the messages should be transferred to L3_MGMT_ENTITY 1201 or to subroutines 1203 through 1205. Subroutine 1203 processes primitives from the link layer which are not recognizable and simply records the fact that such a message has been received. Block 1204 can be used to receive the DL_UDATA_IND primitive. L3_d_l_data_ind 1205 handles actual signaling messages when called from 123work 1201. Subroutine 1205 handles the Q.931 messages and transfers these to msg_preproc 1207. Subroutine 1207 does some of the initial Q.931 verification of the message. These functions include assuring that the protocol discriminator specifies one of the Q.931 protocols, checking the call reference value, and checking the message type to assure that it is a valid message type. The call reference value is checked for being a valid value and whether it refers to currently active call or a new call for which resources are available within switching node 101 to handle.

Msg_preproc 1207 either transfers the message to Q.931 block 1103 or to one of the state machines, GSTA_STM 1106 or 13STA_STM 1105 of FIG. 11. If the message is a global message, it is passed to state machine GSTA_STM 1106. (A global message is one that effects every call on an entire interface, such as a reset on a PRI link.) State machines 1105 and 1106 take care of particular types of messages and utilize block 1103 to process these messages. If the call reference value indicates a regular message, state machine 1105 is called. If the call reference value is null, then block 1102 passes this message directly to block 1103, since no state processing is required. In addition, if block 1207 of FIG. 12 determines that it has received an incorrect message, it transfers a message up to block 1103 of FIG. 11 requesting the transmission of a Q.931 message back to the other side informing the other side that an invalid message was received. (An example of an invalid message is an invalid protocol discriminator.) When msg_preproc 1207 is processing the message from link management, it utilizes find_ldcn 1206 to determine the translation between the sintf number and the LDCN. The LDCN is used to identify messages to the entities above L3_PROCESSING 1102. During the establishment of signaling by L3_MGMT_ENTITY 1201, block 1201 defines the correspondence between the LDCN and sintf number. The output of Q.931 1103 flows directly through block 1102 since block 1103 has formatted the message for link management 330. However, messages from L3_MGMT_ENTITY 1201 must first be formatted by subroutine send_12 1202 before being transferred to link management 330. Note, when L3_MGMT_ENTITY 1201 selects the LDCN, block 1201 reports this number up to the management entity at the transport level via path 1112.

Consider elements 1103 through 1108 of FIG. 11. GSTA_STM 1106, 13STA_STM 1105, and 14STA_STM 1107 represent information being placed into state queues for execution by the system task dispenser. For example, when L3_PROCESSING 1102 receives a global call reference value, it places information into the queue for GSTA_STM 1106 which results in the system task dispenser initializing the global state machine resulting in a call to block 1103. Task 1105 handles messages which have a specific call reference value and initiates, under control of the system task dispenser, the appropriate routines within block 1103.

Block 1103 is responsible for performing all of the Q.931 protocol handling. The functions performed by block 1103 in processing the Q.931 protocol are clearly defined in the CCITT Blue Book specifications. Ovals 1105 and 1106 represent the execution of a task by the system task dispenser. These tasks handle particular types of call reference values and perform their work by calling specific parts of block 1103; whereas the tasks represented by ovals 1105 and 1106 are not directly specified by the ISDN specifications their functions are. The purpose of showing a task being initiated out of the ovals is to indicate that the system task dispenser controls the initialization of these tasks. For example, oval 1108 represents the request that block 1104 be executed when information is put into a queue of the system task dispenser indicating that block 1104 should be executed.

Block 1104 serves as an interface to transport layer 205 and processes messages coming down from the transport layer 205 either to convert these messages into signaling messages to be processed by block 1103 via oval 1105 or to handle request for facilities or transport capabilities from the higher levels. The primary job of INTF_MANAGER 1104 is the management of facility and transport for a particular interface. In order to do this, block 1104 is responsible for handling the initial set up of calls, e.g., the call request and negotiating the number of channels necessary for each call. In order to perform this function, block 1104 is aware of the number of B channels associated with each LDC and chooses a particular B channel or channels to be used for a call. It is not the responsibility of block 1104 to determine a path through a switching node such as switching node 101 or a path through multiple switching nodes. Transport layer 205 has the responsibility for finding that type of a path as is described in a later section. Block 1104 determines by negotiation which B channels are used for a particular call. This negotiation is carried out with another corresponding entity in the other system element also attempting to set up that call, e.g., remote telemarketing terminal 104 of FIG. 3.

During the set up of a call originated by an individual telephone, block 1104 initially negotiates with the telephone concerning which B channel is utilized to transport the voice information and handles the signaling involved in the Q.931 protocol. In addition, interface manager 1104 sends the appropriate commands down to the link and physical layers to cause the interface itself to be appropriately set up.

As the call progresses, transport layer 332 determines where the call is going to and sets up the internal switching within the node 101. Transport layer 332 uses the intra-nodal routing routine to accomplish this function. After the transport has been arranged through node 101, transport layer 332 invokes block 1104 via oval 1108 to negotiate the setup of the call on the outgoing interface of node 101. Block 1104 performs this in a similar manner to the negotiation of the original setup request from the originating telephone. In summary, block 1104 is responsible for the selection by negotiation which B channels are used from a particular system interface for a call.

To better understand the functions of the blocks illustrated in FIG. 11, consider the following detailed example concerning the setting up of a call to switching node 101. Initially, there would be a request (DL_DATA_IND) primitive coming up from link management 330. L3_PROCESSING 1102 is responsive to this primitive to check the existence of a specific call reference value and to check the protocol. Block 1102 then places into the queue for 13STA_STM 1105 the fact that a message has been received. Under control of the system task dispenser, oval 1105 initiates the execution of block 1103 to do the protocol processing on the received message to assure, for example, that the message is of the correct state. Block 1103 then indicates to the system task dispenser via oval 1108 that there is a call request and that block 1104 should be executed. Block 1104 then verifies that there is a B channel available on the requested interface to handle this call and sends back a call proceeding request via oval 1105. Under control of the system task dispenser, oval 1105 initiates block 1103 to generate the call proceeding message back to network layer 204 in the originating telephone. In addition, block 1104 initiates transport layer 332 via oval 1107 to determine that the required resources exist within node 101 to complete the call. The required resources may be limited to those of switching node 101 or may require resources in other nodes in order reach the destination node. It is the responsibility of transport layer 332 to determine whether the destination node can be reached. Note, when block 1103 is invoked to transmit the call proceeding message, block 1103 first checks to make sure that the transmission of the call proceeding message was correct for this stage of the call and forms and sends the call proceeding message to L3_PROCESSING 1102. Block 1102 forms this message into a dl_data_req primitive which is transmitted to link management 330.

During the processing of the information by transport layer 332, if layer 332 has no information for routing to the destination node, layer 332 with session layer 333 determines the path to the destination node. Session layer 333 determines which node the call is destined for by evaluating the dial digits. Once session layer 333 has picked the node, transport layer 332 is responsible for determining how to get to that node. After determining how to route the call, transport layer 332 sets up a call to the destination node. In order to set up the call to the other node, transport layer 332 invokes INTF_MANAGER 1104 via oval 1108. Block 1104 selects an interface that is controlled by the LDC and connected to the destination node, and block 1104 then selects a B channel on that interface. After accomplishing this selection, block 1104 negotiates the set up of the call with the other node. In order to negotiate the set up of the call, block 1104 invokes the state machine associated with oval 1105 to have the proper message generated by block 1103 for transmission to the destination node. Block 1104 also selects the call reference value to be utilized on the LDC. Block 1103 verifies that the message can be transmitted (a setup message) and formulates this message and transfers it to L3_PROCESSING block 1102.

The information on paths 1113 and 1114 comprises messages that were received that had a null call reference value. These messages fall into two general categories. The first category is messages which are being transported back and forth between layers 333 through 336 with their equivalent peers in another node. The second category of messages is those messages that are not call related. For example, the button pushes on a station set are not call related and are transmitted from the station set to the node with a null call reference value.

Figure 13:
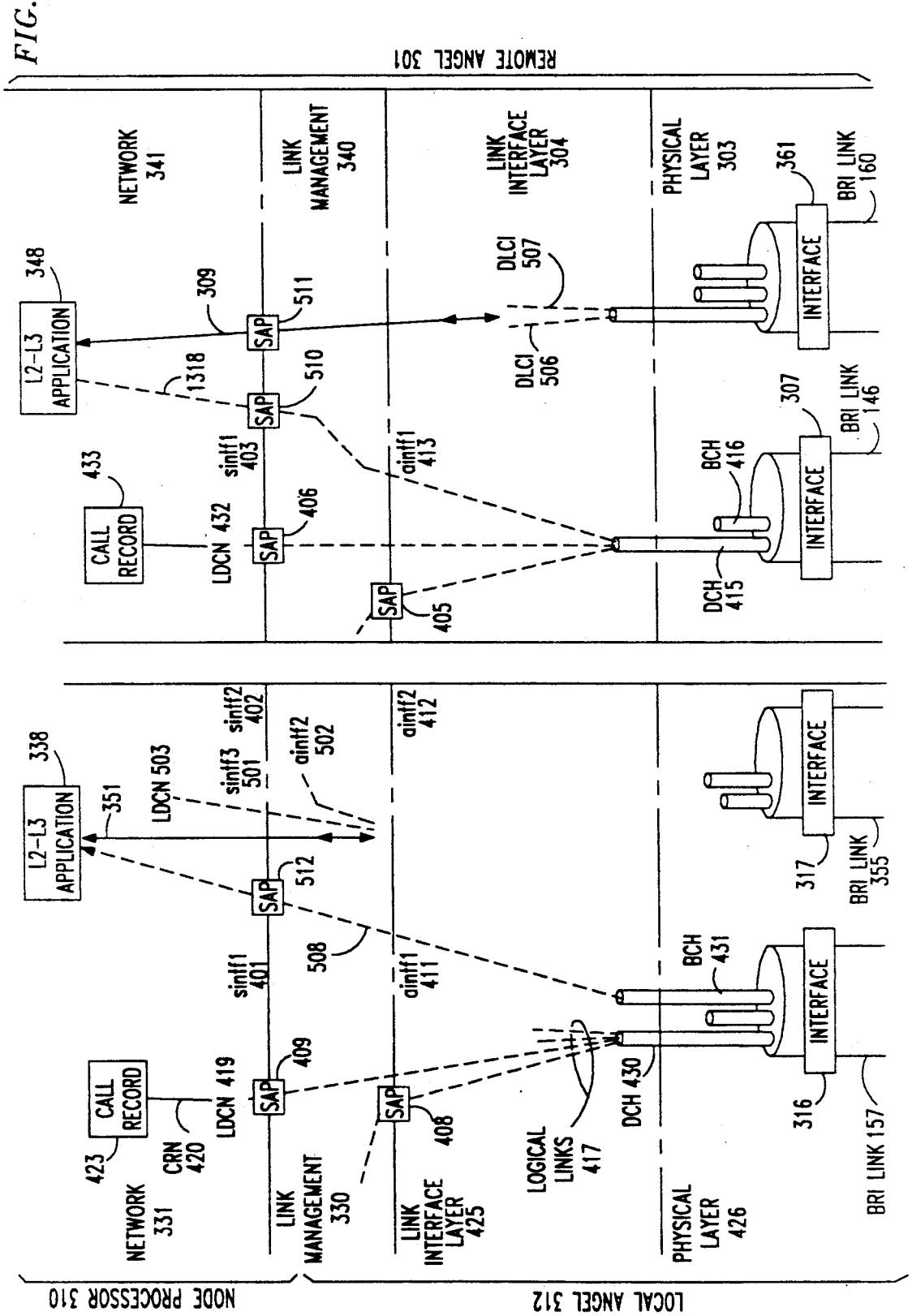

The following describes three more embodiments for communicating between L2-L3 applications 338 and 348 of FIG. 3. In the first embodiment, a packetized channel is established between L2-L3 application 348 and L2-L3 application 338 by establishing a LAPD packet protocol on a B channel of BRI links 146 and 157. The second embodiment communicates between L2-L3 application 348 and L2-L3 application 338 by establishing a logical link in the logical links of the D channels of BRI links 146 and 157 and is illustrated in FIG. 13. Such logical links are also illustrated in FIG. 13. The third embodiment communicates between the L2-L3 applications by establishing a communication path (e.g., path 1418) utilizing user-user temporary signaling information (call or non-call related) messages on LDCN 1419 and is illustrated in FIG. 14. The fourth embodiment is very similar to the first embodiment. In the fourth embodiment, a packetized channel is established between L2-L3 application 348 and L2-L3 application 338 by establishing a LAPD packet protocol on a subchannel of a B channel such as a B channel of BRI links 146 and 157. Using the second, third, or fourth embodiments, L2-L3 application 338 and L2-L3 application 348 communicate with each other in the same manner as in the first embodiment.

Consider how the second embodiment establishes a logical link on D channels of BRI links 146 and 157. As in the first embodiment, L2-L3 application 348 uses the administered telephone number of node processor 118 to initially request that software layers 341 through 343 transmit a setup message with the telephone number in the calling party number field. In addition, the setup message requests that a packetized logical link be established on D channel of BRI link 146. By transmitting the setup message, L2-L3 application 348 is placing a call to L2-L3 application 338.

The setup message is transmitted in the LDC of the D channel of BRI link 146, which had previously been established when BRI link 146 was initialized to switching node 109. Recall that LDC is a logical link in the D channel. Switching node 109 processes this request in a normal manner with respect to both switching node 101 and remote switch 104 and retransmits the request to switching node 101. L2-L3 application 338 answers this call, and messages are transmitted back and forth as if a human being had answered the call on a convention telephone set. Initially, the setup message is transferred to network layer 331. Network layer 331 transfers the setup message to session layer 333 via transport layer 332. When the setup messages are received, session layer 333 handles this call in the same manner as it would any other call. Session layer 333 is responsive to the telephone number to determine that it is directed to L2-L3 application 338 as an endpoint and transfers the setup message to the application layer 335. Application layer 335 examines the dialed number in the called party number field and, based on that, transfers the call setup message to L2-L3 application 338.

If L2-L3 application 338 chooses to accept the call upon receipt of the call setup message, L2-L3 application 338 transmit down to the lower software layers a request that a logical link be established and that an acknowledgement message be sent. In response, network layer 331 formulates a connection message that is then transferred back to remote switch 104 via switching node 109. Network layer 331 also negotiates with switching node 109 for a logical link. Switching node 109 is responsive to the connection message to interconnect the negotiated logical link from BRI link 157 to the previously selected logical link of BRI link 146. If L2-L3 application 338 decides not to answer the message, then network layer 331 tears the call down by sending the proper messages to remote angel 301 and switching node 109.

After requesting the transmission of the connection message, L2-L3 application 338 transmits a request via link management 330 to establish the packetized channel on the selected logical link. In response, link management 330 requests that local angel 312 control interface 316 so that interface 316 establishes a packetized channel on the designated logical link of BRI link 157 and that link interface layer 313 establish a mode 3 LAPD protocol on the packetized channel. In addition, link management 330 designates that the information from this packetized channel is to be directed to L2-L3 application 338.

After receiving the connection message, L2-L3 application 348 in remote angel 301 also establishes a packetized channel on the designated logical link of BRI link 146 in a manner similar to that utilized by L2-L3 application 338. In addition, L2-L3 application 348 transmits information down to the management information base 363 part of layers 304 that results in link interface 304 transmitting all information received from interfaces 360 and 361 connected to network 306 directly to L2-L3 application 348 via path 309. In accordance with the invention, L2-L3 application 348 is responsive to this information to transmit it via the packetized channel established to L2-L3 application 338. Similarly, L2-L3 application 348 is responsive to information received from L2-L3 application 338 to communicate this information to link interface 304 via path 309. The result is that the interfaces 360 through 361 are controlled by the high-level structure of node processor 118 starting with link management 330.

The third embodiment communicates between L2-L3 application 348 and L2-L3 application 338 by establishing user-user signaling connection on the LDCs of the D channels of BRI links 146 and 157. Information received via this user-user signaling connection is directed to L2-L3 applications 338 and 348 by network layers 331 and 341, respectively. Each node processor and remote angels in the remote switches of FIG. 1 has an administered telephone number which is only used for performing network setup functions. When remote angel 301 is initialized, L2-L3 application 348 looks in an internal table and selects the primary node processor which is node processor 118. Associated with this primary processor table entry is the telephone number for node processor 118. L2-L3 application 348 uses the administrated telephone number of node processor 118 to initially request that software layers 341 through 343 transmit a setup message with the telephone number in the calling party number field to switching node 101. By transmitting the setup message, L2-L3 application 348 is placing a call to L2-L3 application 338.

The setup message is transmitted in the LDC of BRI link 146, which had previously been established when BRI link 146 was initialized to switching node 109. Switching node 109 processes this request in a normal manner with respect to both switching node 101 and remote switch 104 and retransmits the request to switching node 101. L2-L3 application 338 answers this call, and messages are transmitted back and forth as if a human being had answered the call on a convention telephone set. Initially, the setup message is transferred to network layer 331. Network layer 331 transfers the setup message to session layer 333 via transport layer 332. When the setup messages are received, session layer 333 handles this call in the same manner as it would any other call. Session layer 333 is responsive to the telephone number to determine that it is directed to L2-L3 application 338 as an endpoint and transfers the setup message to the application layer 335. Application layer 335 examines the dialed number in the called party number field and, based on that, transfers the call setup message to L2-L3 application 338.

If L2-L3 application 338 chooses to accept the call upon receipt of the call setup message, L2-L3 application 338 transmit down to network layer 331 a request that a user-user signaling connection be established and that an acknowledgement message be sent. In response, network layer 331 establishes the user-user signaling connection and formulates a connection message that is then transferred back to remote switch 104 via switching node 109. Network layer 331 also negotiates with switching node 109 for a user-user signaling connection. Switching node 109 is responsive to the connection message to interconnect the negotiated user-user signaling information from BRI link 157 to BRI link 146. If L2-L3 application 338 decides not to answer the message, then network layer 331 tears the call down by sending the proper messages to remote angel 301 and switching node 109.

After requesting the transmission of the connection message, L2-L3 application 338 transmits a request to network layer 331 to establish the packetized channel on the user-user signaling connection. In addition, network layer 331 designates that the information from this packetized channel is to be directed to L2-L3 application 338.

After receiving the connection message, L2-L3 application 348 in remote angel 301 also establishes a packetized channel on the designated user-user signaling connection of BRI link 146 in a manner similar to that utilized by L2-L3 application 338. In addition, L2-L3 application 348 transmits information down to the management information base 363 part of layers 304 that results in link interface 304 transmitting all information received from interfaces 360 and 361 connected to network 306 directly to L2-L3 application 348 via path 309. In accordance with the invention, L2-L3 application 348 is responsive to this information to transmit it via the packetized channel established to L2-L3 application 338. Similarly, L2-L3 application 348 is responsive to information received from L2-L3 application 338 to communicate this information to link interface 304 via path 309. The result is that the interfaces 360 through 361 are controlled by the high-level structure of node processor 118 starting with link management 330.

In the fourth embodiment, a B channel is established between L2-L3 application 348 and L2-L3 application 338 as previously described for the first embodiment. This B channel is divided into subchannels by layers 313 and 311 in node processor 118 and layers 304 and 303 in remote angel 301 in the manner described with respect to FIG. 2. The L2-L3 applications select one subchannel and establish a packetized path on that subchannel. This packetized subchannel is then used in the same manner as the packetized B channel of the first embodiment as illustrated in FIGS. 4 and 5. The remaining subchannels may be used for other functions such as communicating voice or data information.

It is to be understood that the above-described embodiments are merely illustrative of the principles of the invention and that other arrangements may be devised by those skilled in the art without departing from the spirit and scope of the invention. In particular, other software structures may be used to implement the invention. Further, one skilled in the art could readily envisage the use of frame relaying to transfer data from the link interface layer of a remote switch to the link management layer of a node processor.

We claim:

1. An apparatus for controlling a remote switch by a central processor via a switching system interconnecting said remote switch and said central processor, said apparatus comprising:

means for establishing a transport path between said central processor and said remote switch by placing a call that is communicated through said switching system by said central processor and said remote switch each performing a plurality of hierarchical call control functions to initiate and maintain said call utilizing a standard protocol in conjuction with said switching system;

means in said remote switch for communicating signaling and control information for other calls on said remote switch to said central processor via said transport path after performing only the lowest ones of said plurality of hierarchical call control functions;

means in said central processor for performing remaining ones of said plurality of hierarchical call control functions on said communicated information to generate other signaling and control information and for communicating said other information to said lowest ones of said plurality of hierarchical call control functions in said remote switch, whereby said central processor controls said other calls on said remote switch;

means for detecting a failure of said call;

said establishing means responsive to said failure for establishing a second transport path between said central processor and said remote switch by placing a second call through said switching system by said central processor and said remote switch each performing said plurality of hierarchical call control functions to initiate and maintain said second call utilizing said standard protocol in conjunction with said switching system.

means for detecting an inability to establish calls between said remote switch and said central processor; and said establishing means responsive to the detection of said inability for establishing a third transport path between another central processor and said remote switch by placing a third call through said switching system by said other central processor and said remote switch each performing said plurality of hierarchical call control functions to initiate and maintain said third call utilizing said standard protocol in conjunction with said switching system.

2. The apparatus of claim 1 wherein said remote switch comprises a remote processor;

said central processor and said remote processor each comprising a plurality of software layers, and lowest ones of said software layers correspond to said lowest ones of said plurality of hierarchical call control functions and perform low level call control, and an intermediate software layer and highest software layers correspond to said remaining ones of said plurality of hierarchical call control functions and perform high level call control;

said communicating means in said central processor and said remote switch each comprising an application software module in said highest software layers;

said lowest software layers of said remote processor responsive to said signaling and control information for said other calls for transferring said information to said application software module of said remote processor;

said application software module of said remote processor responsive to said information for encapsulating said information and for transferring said encapsulated information to said lowest software layers of said central processor via said transport path;

said lowest software layers of said central processor responsive to said encapsulated information to transfer the latter information to said application software module of said central processor; and said application software module of said central processor responsive to said encapsulated information for recovering said information and for transferring said recovered information to said intermediate software layer for high level call control processing by said intermediate software layer and said highest software layers to generate said other information.

3. The apparatus of claim 2 wherein said intermediate software layer and said highest software layers in said central processor control communicate said other information to said remote switch by communicating said other information from said intermediate software layer of central processor to said application software module of said central processor;

said application software module of said central processor responsive to said other information for encapsulating said other information and for transferring said encapsulated other information to said lowest software layers of said remote processor via said transport path;

said lowest ones of said software layers of said remote processor responsive to said encapsulated other information for transferring said encapsulated other information to said application software module of said remote processor; and said application software module of said remote processor responsive to said encapsulated other information for recovering said other information and for transferring said other information to said lowest software layers of said remote processor to control said other calls.

4. The apparatus of claim 1 wherein said switching system is interconnected to said central processor and said remote switch by a plurality of standard links each comprising a signaling channel and a plurality of transport channels, said call is communicated from said central processor to said switching system by a first one of said plurality of standard links and said call is communicated from said switching system to said remote switch by a second one of said plurality of standard links, said transport path is established on a packetized one of said plurality of transport channels of said first one of said standard links and a packetized one of said plurality of transport channels of said second one of said standard links in accordance with said standard protocol.

5. The apparatus of claim 4 wherein said standard links are ISDN links and said standard protocol is the ISDN protocol.

6. The apparatus of claim 1 wherein said switching system is interconnected to said central processor and said remote switch by a plurality of standard links each comprising a signaling channel and a plurality of transport channels, and said call is communicated from said central processor to said switching system by a first one of said plurality of standard links and said call is communicated from said switching system to said remote switch by a second one of said plurality of standard links, and said transport path is established on user communication facilities of said signaling channel of said first one of said standard links and on user communication facilities of said signaling channel of said second one of said standard links in accordance with said standard protocol.

7. The apparatus of claim 6 wherein said standard links are ISDN links and said standard protocol is the ISDN protocol.

8. The apparatus of claim 1 wherein said switching system is interconnected to said central processor and said remote switch by a plurality of standard links each comprising a signaling channel and a plurality of transport channels and each signaling channel having a plurality of logical links, and said call is communicated from said central processor to said switching system by a first one of said plurality of standard links and said call is communicated from said remote switch to said switching system by a second one of said plurality of standard links, and said transport path is established on a logical link of said signaling channel of said first one of said standard links and on a corresponding logical link of said signaling channel of said second one of said standard links in accordance with said standard protocol.

9. The apparatus of claim 8 wherein said standard links are ISDN links and said standard protocol is the ISDN protocol.

10. An apparatus for controlling a remote switch by a central processor via a standard link, said apparatus comprising:

means for establishing a transport path between said central processor and said remote switch by placing a call on said standard link by said central processor and said remote switch each performing a plurality of hierarchical call control functions to initiate and maintain said call utilizing a standard protocol on said standard link;

means in said remote switch for communicating signaling and control information for other calls on said remote switch to said central processor by said transport path after performing only the lowest ones of said plurality of hierarchical call control functions;

means in said central processor for performing remaining ones of said plurality of hierarchical call control functions on said communicated information to generate other signaling and control information and for communicating said other information to said lowest ones of said plurality of hierarchical call control functions in said remote switch, whereby said central processor controls said other calls on said remote switch;

means for detecting a failure of said standard link;

said establishing means responsive to said failure for establishing a second transport path on a second standard link between said central processor and said remote switch by placing a second call on said second standard link, by said central processor and said remote switch each performing said plurality of hierarchical call control functions to initiate and maintain said second call utilizing said standard protocol, whereby upon establishment of said second path, said means in said central processor and said means in said remote switch use said second path instead of said path;

said detecting means further capable of detecting the failure of said second standard link; and said establishing means responsive upon detection of the failure of said second standard link for establishing a third transport path via a switching system, that interconnects said central processor and said remote switch, between said central processor and said remote switch by placing a third call through said switching system, by said central processor and said remote switch each performing said plurality of hierarchical call control functions to initiate and maintain said third call utilizing said standard protocol, whereby upon establishment of said third path, said means in said central processor and said means in said remote switch use said third path instead of said second path.

11. The apparatus of claim 10 further comprises means for detecting an inability to establish calls between said remote switch and said central processor;

said establishing means responsive to the detection of said inability for establishing a fourth transport path on a third standard link between another central processor and said remote switch by placing a fourth call on said third standard link, by said other central processor and said remote switch each performing said plurality of hierarchical call control functions to initiate and maintain said fourth call utilizing said standard protocol, whereby upon establishment of said fourth path, said means in said central processor and said remote switch use said fourth path;

said means for detecting link failures further capable of detecting the failure of said third standard link; and said establishing means responsive upon detection of the failure of said third standard link for establishing a fifth transport path via said switching system between said other central processor and said remote switch by placing a fifth call through said switching system, by said other central processor and said remote switch each performing said plurality of hierarchical call control functions to initiate and maintain said fifth call utilizing said standard protocol, whereby upon establishment of said fifth path, said means in said other central processor and said means in said remote switch use said fifth path.

12. The apparatus of claim 11 wherein said remote switch comprises a remote processor and a plurality of standard interfaces and said central processor interconnected to another plurality of standard interfaces and said standard link terminates on one of said plurality of standard interfaces and one of said other plurality of standard interfaces;

said central processor and said remote processor each comprising a plurality of software layers, and lowest ones of said software layers correspond to said lowest ones of said plurality of hierarchical call control functions and control said standard interfaces, and an intermediate software layer and highest software layers correspond to said remaining ones of said plurality of hierarchical call control functions and perform high level call control;

said communicating means in said central processor and said remote switch each comprising an application software module in said highest software layer s;

said lowest software layers of said remote processor responsive to said signaling and control information for said other calls from interfaces, terminating other standard links that are communicating said other calls, for transferring said information to said application software module of said remote processor;

said application software module of said remote processor responsive to said information for encapsulating said information and for transferring said encapsulated information to said lowest software layers of said central processor via said transport path;

said lowest software layers of said central processor responsive to said encapsulated information to transfer the latter information to said application software module of said central processor; and said application software module of said central processor responsive to said encapsulated information for recovering said information and for transferring said recovered information to said intermediate software layer for high level call control processing by said intermediate software layer and said highest software layers to generate said other information.

13. The apparatus of claim 12 wherein said intermediate layer and said highest software layers in said central processor control communicate said other information to said remote switch by communicating said other information from said intermediate software layer of central processor to said application software module of said central processor;

said application software module of said central processor responsive to said other information for encapsulating said other information and for transferring said encapsulated other information to said lowest software layers of said remote processor via said transport path;

said lowest ones of said software layers of said remote processor responsive to said encapsulated other information for transferring said encapsulated other information to said application software module of said remote processor; and said application software module of said remote processor responsive to said encapsulated other information for recovering said other information and for transferring said other information to said lowest software layers of said remote processor to control said other standard interfaces.

14. The apparatus of claim 13 wherein each of said standard links comprises a signaling channel and a plurality of transport channels and said transport path is established on a packetized one of said plurality of transport channels in accordance with said standard protocol.

15. The apparatus of claim 14 wherein said standard links are ISDN links and said standard protocol is the ISDN protocol.

16. The apparatus of claim 13 wherein each of said standard links comprises a signaling channel and a plurality of transport channels and said transport path is established by utilizing the user communication facilities of said signaling channel in accordance with said standard protocol.

17. The apparatus of claim 16 wherein said standard links are ISDN links and said standard protocol is the ISDN protocol.

18. The apparatus of claim 13 wherein each of said standard links comprises a signaling channel and a plurality of transport channels and said signaling channel having a plurality of logical links and said transport path is established on one of said logical links in accordance with said standard protocol.

19. The apparatus of claim 18 wherein said standard links are ISDN links and said standard protocol is the ISDN protocol.

20. A method for controlling a remote switch by a central processor via a switching system interconnecting said remote switch and said central processor, said method comprising the steps of:

placing a call that is communicated through said switching system by said central processor and said remote switch each performing a plurality of hierarchical call control functions to initiate and maintain said call utilizing a standard protocol in conjunction with said switching system;

establishing a transport path between said central processor and said remote switch on said call;

communicating by said remote switch signaling and control information for other calls on said remote switch to said central processor via said transport path after performing only the lowest ones of said plurality of hierarchical call control functions;

performing by said central processor remaining ones of said plurality of hierarchical call control functions on said communicated information to generate other signaling and control information and communicating said other information to said lowest ones of said plurality of hierarchical call control functions in said remote switch, whereby said central processor controls said other calls on said remote switch;

detecting a failure of said call;

placing in response to said failure a second call through said switching system by said central processor and said remote switch each performing said plurality of hierarchical call control functions to initiate and maintain said second call utilizing said standard protocol in conjunction with said switching system;

establishing in response to said second call a second transport path between said central processor and said remote switch;

detecting an inability to establish calls between said remote switch and said central processor;

placing in response to the detection of said inability a third call through said switching system by another central processor and said remote switch each performing said plurality of hierarchical call control functions to initiate and maintain said third call utilizing said standard protocol in conjunction with said switching system; and establishing in response to said third call a third transport path between said other central processor and said remote switch.

21. The method of claim 20 wherein said remote switch comprises a remote processor, and said central processor and said remote processor each have a plurality of software layers, and lowest ones of said software layers correspond to said lowest ones of said plurality of hierarchical call control functions and perform low level call control, and an intermediate software and highest software layers correspond to said remaining ones of said plurality of hierarchical call control functions and perform high level call control, and said central processor and said remote switch each have an application software module in said highest software layers;

said step of communicating said signaling and control information for said other calls comprises the steps of transferring said information to said application software module of said remote processor by said lowest software layers of said remote processor;

encapsulating said information and transferring said encapsulated information to said lowest software layers of said central processor via said transport path by said application software module of said remote processor;

transferring said encapsulated information to said application software module of said central processor by said lowest software layers of said central processor; and recovering said encapsulated information and transferring said recovered information by said application software module of said central processor to said intermediate software layer of said central processor for high level call control processing by said intermediate software layer and said highest software layers.

22. The method of claim 21 wherein said step of communicating said other signaling and control information for each control of said remote switch comprises the steps of transferring said other information from said intermediate software layer of said central processor to said application software module of said central processor;

encapsulating said other information and transferring said encapsulated other information to said lowest software layers of said remote processor via said transport path by said application software module of said central processor;

transferring said encapsulated other information to said application software module of said remote processor by said lowest ones of said software layers of said remote processor; and recovering said other information from said encapsulated other information and transferring said other information by said application software module of said remote processor to said lowest software layers of said remote processor to control said other calls.

23. The method of claim 22 wherein said switching system is interconnected to said central processor and said remote switch by a plurality of standard links each comprising a signaling channel and a plurality of transport channels, and said call is communicated from said central processor to said switching system by a first one of said plurality of standard links, and said call is communicated from said remote switch to said switching system by a second one of said plurality of standard links, and said placing step comprises the step of initiating and maintaining said transport path on a packetized one of said plurality of transport channels of said first one of said standard links and a packetized one of said plurality of transport channels of said second one of said standard links in accordance with said standard protocol.

24. The method of claim 23 wherein said standard links are ISDN links and said standard protocol is the ISDN protocol.

25. The method of claim 22 wherein said switching system is interconnected to said central processor and said remote switch by a plurality of standard links each comprising a signaling channel and a plurality of transport channels, and each signaling channel supporting user communication facilities, and said call is communicated from said central processor to said switching system by a first one of said plurality of standard links, and said call is communicated from said remote switch to said switching system by a second one of said plurality of standard links, and said placing step comprises the step of initiating and maintaining said transport path on user communication facilities of said signaling channel of said first one of said standard links and on user communication facilities of said signaling channel of said second one of said standard links in accordance with said standard protocol.

26. The method of claim 25 wherein said standard links are ISDN links and said standard protocol is the ISDN protocol.

27. The method of claim 22 wherein said switching system is interconnected to said central processor and said remote switch by a plurality of standard links each comprising a signaling channel and a plurality of transport channels, and each signaling channel having a plurality of logical links, and said call is communicated from said central processor to said switching system by a first one of said plurality of standard links, and said call is communicated from said remote switch to said switching system by a second one of said plurality of standard links, and said placing step comprises the step of initiating and maintaining said transport path on one of said plurality of logical links of said signaling channel of said first one of said standard links and on a corresponding one of said plurality of logical links of said signaling channel of said second one of said standard links in accordance with said standard protocol.

28. The method of claim 27 wherein said standard links are ISDN links and said standard protocol is the ISDN protocol.

* * * * *